(12) United States Patent
Sakai et al.

(10) Patent No.: US 8,767,113 B2
(45) Date of Patent: *Jul. 1, 2014

(54) CONDITION CHANGING DEVICE

(71) Applicant: Olympus Imaging Corp., Tokyo (JP)

(72) Inventors: Koji Sakai, Hachioji (JP); Izumi Sakuma, Musashino (JP); Osamu Nonaka, Sagamihara (JP)

(73) Assignee: Olympus Imagaing Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/833,186

(22) Filed: Mar. 15, 2013

(65) Prior Publication Data

US 2013/0271401 A1    Oct. 17, 2013

Related U.S. Application Data

(62) Division of application No. 12/838,276, filed on Jul. 16, 2010, now Pat. No. 8,466,996.

(30) Foreign Application Priority Data

Jul. 22, 2009    (JP) ................................. 2009-170702

(51) Int. Cl.
*H04N 5/222* (2006.01)
*H04N 5/225* (2006.01)
*G06F 3/041* (2006.01)

(52) U.S. Cl.
USPC .................. 348/333.01; 348/376; 345/173

(58) Field of Classification Search
USPC ............ 348/270.99, 333.01, 333.02, 333.05, 348/333.07, 333.11, 333.12; 345/173
See application file for complete search history.

(56) References Cited

U.S. PATENT DOCUMENTS

| | | | | |
|---|---|---|---|---|
| 2006/0026536 | A1* | 2/2006 | Hotelling et al. | 715/863 |
| 2006/0140621 | A1* | 6/2006 | Misawa | 396/374 |
| 2007/0040810 | A1* | 2/2007 | Dowe et al. | 345/173 |
| 2010/0026719 | A1* | 2/2010 | Ozawa et al. | 345/650 |

FOREIGN PATENT DOCUMENTS

| | | |
|---|---|---|
| JP | 2008-011935 | 1/2008 |
| JP | 2008-257427 | 10/2008 |
| WO | WO 2006/020305 | 2/2006 |
| WO | WO 2007/079425 | 7/2007 |
| WO | WO 2007/149357 | 12/2007 |

* cited by examiner

*Primary Examiner* — Trung Diep
(74) *Attorney, Agent, or Firm* — John C. Pokotylo; Straub & Pokotylo

(57) ABSTRACT

A condition change unit of the present invention changes operating conditions of a device. The condition change unit comprises a display section for displaying images, a touch panel provided on the display section, a detection section for detecting input operations to the touch panel, a change condition setting section for setting types of change conditions, based on form of the input operations detected by the detection section, an operation guide image display section for displaying guidance images, for setting specific parameters of the change conditions, on the display section, in accordance with the type of change condition that has been set, and a parameter change section for changing parameters of the change condition based on an input operation to a screen on which the operation guidance operation images are displayed that has been detected by the detection section.

4 Claims, 20 Drawing Sheets

CONDITION CHANGING DEVICE

RELATED APPLICATIONS

This application is a divisional of U.S. patent application Ser. No. 12/838,276 (referred to as "the '276 application" and incorporated herein by reference), filed on Jul. 16, 2010, titled "CONDITION CHANGING DEVICE," and listing Koji SAKAI, Izumi SAKUMA and Osamu NONAKA, as the inventors, the '276 application being based upon and claiming benefit under 35 U.S.C. §119, to the filing date of prior Japanese Patent Application No. 2009-170702, filed on Jul. 22, 2009. The entire contents of the '276 application and the foregoing Japanese patent application are incorporated herein by reference.

BACKGROUND OF THE INVENTION

1. Field of the Invention

The present invention relates to a condition changing device, and in detail relates to a condition changing device that has a touch panel as a display section, and is capable of inputting operating conditions according to operating states of this touch panel.

2. Description of the Related Art

Precision and transparency of touch panels have improved, and in recent years touch panels have been used in small portable devices such as digital cameras, music players and mobile phones. These mobile devices are becoming increasingly multifunctional, with a need for various condition settings on a touch panel, and since they are mobile devices, there is also a need for usability.

Japanese patent application number 4178484 (laid-open Oct. 19, 1999) is an example of a touch panel used in a digital camera. In this related art, there is provided a digital camera in which, in a playback state where a grip section of the camera is not being held, an image is displayed on the entire screen of a rear display section having a touch panel, while in a shooting state where the grip section is being held a key icon is displayed at a bottom part of the screen.

Also, the operating mode of a touch panel is generally such that respective items are displayed at specified places on the screen, and if a desired item is touched conditions for that item are executed, or a new screen corresponding to that item is switched to. However, touch panels have recently been developed that detect rotation upon the touch panel to enable operations like jog dial, and that can detect touching of multiple locations at the same time.

SUMMARY OF THE INVENTION

The present invention has as its object to provide a condition changing device that performs changing of conditions by changing the form of an input operation when performing condition changing with input from a touch panel.

A condition changing device of the present invention comprises: a display section for displaying images, a touch panel provided on the display section, a detection section for detecting input operations to the touch panel, a change condition setting section for setting a type of a condition to be changed based on a form of the input operation, an operation image display section for displaying an operation guide image for setting of a specific parameter of the change condition, and a parameter change section for changing a parameter of the change condition based on an input operation to the screen on which the operation guide image is displayed.

DETAILED DESCRIPTION OF THE PREFERRED EMBODIMENTS

Preferred embodiments using a digital camera to which the present invention has been applied will be described in the following in accordance with the drawings. A digital camera of a preferred embodiment of the present invention has an imaging section 20. A subject image is converted to image data by this imaging section 20, and the subject image is subjected to live view display on a display section 16 arranged on the rear surface of the camera body based on this converted image data. A photographer determines composition and photo opportunity by looking at the live view display. At the time of release, it is possible to put image data of a still picture into a storage medium. It is also possible to set conditions such as exposure correction, zoom, shutter speed and aperture value by touching the screen of the live view display.

Figure 1:
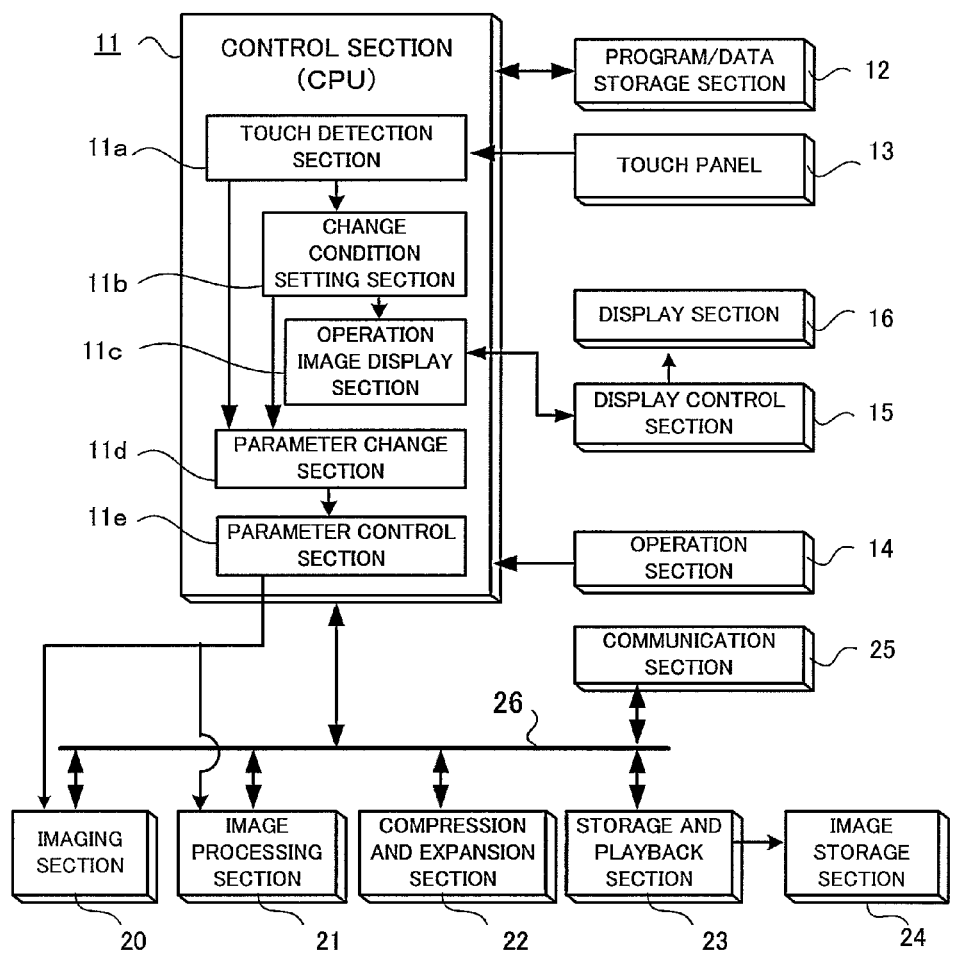
FIG. 1 is a block diagram showing the structure of a digital camera of a first embodiment of the present invention.

FIG. 1 is a block diagram showing the structure of a digital camera of a first embodiment of the present invention. A control section (CPU: Central Processing Unit) 11 executes a control program stored in a program/data storage section 12, and performs overall control of the digital camera. A touch detection section 11a, change condition setting section 11b, operation image display section 11c, parameter change section 11d and parameter control section 11e are provided in the control section 11. The sections 11a to 11e within the control section 11 are part of the processing executed by the control program, and so will be described as functional sections contained within the control section 11.

The touch detection section 11a detects input operations to a touch panel 13. The touch detection section 11a is capable of detecting single finger touch, two finger touch and two finger rotation as types of mode of input operation, from position and time of a touch operation on the screen, and is also capable of detecting the position and length of these touches. In this specification touching means bringing a finger etc. into direct contact with or bringing a finger close to the screen of the touch panel 13, and moving the finger or the like by rotating or sliding etc. in a state where the finger is in contact with or close to the screen.

The change condition setting section 11b sets types of conditions to be changed based on a form of input detected by the touch detection section 11a. With the digital camera of this embodiment, exposure correction, zooming, aperture value, shutter speed (SS) etc. can be configured by changing a mode of input operation for the touch panel 13.

The operation image display section 11c displays operation guide images for setting specific parameters of change conditions on the screen of the display section 16, according to a type of the change condition that has been set by the change condition setting section 11b. As described previously, with this embodiment, for any of exposure correction, zooming, or aperture value and shutter speed, setting is possible for specific parameters (for example exposure correction amount, zoom up or zoom down, and aperture value and shutter speed) by operating the touch panel 13.

In this case, if there is nothing to give any indication, setting of these parameters is difficult for a user. With this embodiment therefore, operation guide images are displayed so as to enable the user to perform parameter setting easily.

The operation image display section 11c reads out specified operation guide images from the program/data storage section 12 according to a change condition, outputs to a display control section 15, and carries out display of the operation guide images by having the display control section 15 carry out display control.

The parameter change section 11d receives output from the change condition setting section 11b, and prepares control parameters according to the type of condition that has been set by the change condition setting section 11b. As a result of the user touching the operation guide images on the screen of the display section 16 under the set change condition, the touch detection section 11a detects position and length of the user input operation at that time. The parameter change section 11d is input with the state of this input operation from the touch detection section 11a, and specifically changes parameter data that corresponds to the set change condition.

The parameter control section 11e controls parameters of various shooting conditions and playback conditions based on user instruction. Here, user instruction means setting using a menu screen (not shown), direct setting from the operation section 14, and touch input to the touch panel 13. With touch input from the touch panel 13, the parameter control section 11e receives parameter change values notified from the parameter change section 11d, and changes specific conditions of the imaging section 20 and the image processing section 21.

For example, taking the imaging section 20, control is carried out so as to perform setting changes for focus position, zoom value, aperture diameter (aperture value), shutter speed, exposure correction etc. For the image processing section 21 on the other hand, control is carried out to perform setting changes for contrast, white balance, ISO speed etc. In this specification, the case of changing zoom value, aperture value, shutter speed and exposure correction will be described in detail later, but it is possible to carry out the same control for other parameter change values as well.

As described above, the program/data storage section 12 stores programs for causing operation of the control section 11, and image data for causing display of selected operation guide images by the operation image display section 11c. As well as these programs and data, various other data are stored, such as programs for camera control and icons for display on the screen, image data for menu screens, as well as temporary storage of image data acquired by the imaging section 20, and adjustment values for camera control.

A display control section 15 displays live view display at the time of shooting, playback images at the time of playback, or menu images. The display control section 15 also carries out image processing etc. to superimpose icons on live view images in accordance with instructions. The display control section 15 also performs superimposing processing to superimpose operation guide images read out from the program/data storage section 12 on the live view image, in accordance with instruction by the operation image display section 11c. The display section 16 has a display such as a liquid crystal monitor or organic EL arranged on a rear surface of the body, and display control is carried out by the display control section 15.

The touch panel 13 in integral with the display section 16, and is arranged on the front surface of the display section 16. The touch panel 13 detects a finger etc. of the user coming into direct contact or coming close, and outputs detection results to the touch detection section 11a. As the touch panel, there are various systems, such as resistive film, capacitive, photoelectric sensor, etc., and it is possible to adopt any system. A touch panel adopting the photoelectric sensor system will be described later using FIG. 2.

The operation section 14 has various operating buttons such as a button operating section, a release button, a power switch, a playback button, and a mode switching button, an operation dial and operation keys, and is an operation member for a user to set modes and parameters etc.

The control section 11 is connected to a bus 26, and the imaging section 20, image processing section 21, compression and expansion section 22, storage and playback section 23, and communication section 25 are connected to this bus 26. The imaging section 20 includes an imaging lens for forming a subject image, an image sensor for converting the subject image to image data, and as processing circuits for these, as well as an aperture and a shutter provided in the optical path of the imaging lens. Image data generated by the imaging section 20 is output to the bus 26.

The image processing section 21 performs various image processing such as digital amplification of digital image data (digital gain adjustment processing), color correction, gamma (γ) correction, contrast correction, image generation for live view display, movie image generation etc. The compression and expansion section 22 is a circuit for compressing image data of still pictures and movies temporarily stored in the program/data storage section 12 using a compression scheme such as JPEG or TIFF, and expanding such data for display etc. Image compression is not limited to JPEG and TIFF, and it is also possible to apply other compression methods.

The storage and playback section 23 stores image data, that has been compressed in the compression and expansion section 22, in the image storage section 24, and also reads out image data of taken images that has been stored in the image storage section 24, expands this data in the compression and expansion section 22, and performs playback display of this expanded image data. The image storage section 24 is storage medium for data that can be built into the digital camera body, or can be loaded into the camera. The communication section 25 transmits and receives image data to and from external devices.

Figure 2A:
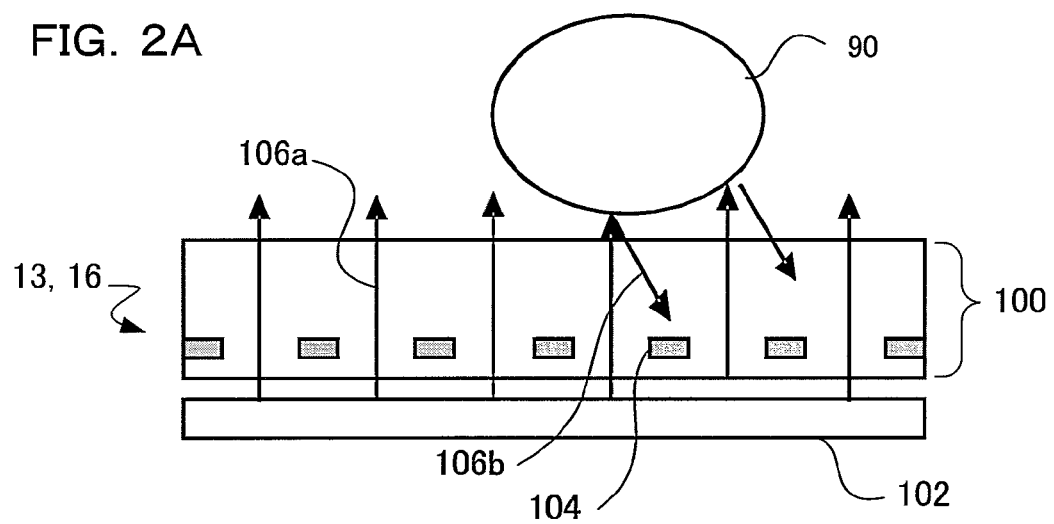
FIG. 2A and FIG. 2B are cross-sectional drawings showing the structure of a touch panel, in the digital camera of the first embodiment of the present invention.
Figure 2B:
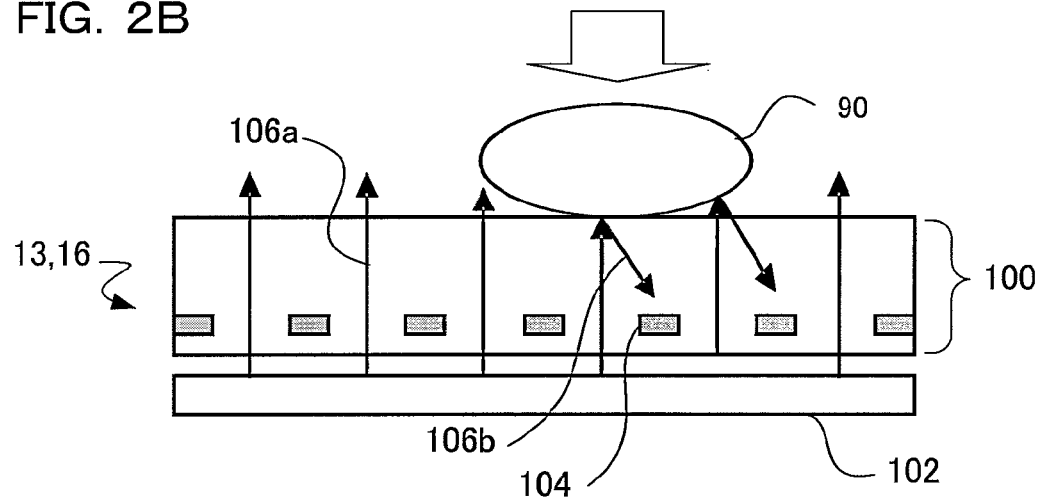

Next, the structure of a photoelectric sensor type touch panel 13 integrated with the display section 16 will be described using FIG. 2A and FIG. 2B. FIG. 2A and FIG. 2B are cross sectional schematic diagrams of the touch panel 13 and display section 16, for the case where a user's finger is close to the touch panel 13, and a case where the user's finger is in direct contact with the touch panel 13, respectively. As shown in FIG. 2A, this touch panel has optical sensors 104 arranged two dimensionally at specified intervals inside a liquid crystal section 100, and a backlight 102 is provided on a rear surface of the liquid crystal section 100.

In the event that irradiated light 106a from the backlight 102 is not reflected by the user's finger 90, then it simply diverges to the outside. In the event that the user's finger 90 is slightly apart from or close to the touch panel 13, then the irradiated light 106a is reflected by the user's finger 90, as shown in FIG. 2A, and some of that reflected light is detected by the optical sensors 104.

Further, if the user's finger 90 is brought close to the touch panel 13, then as shown in FIG. 2B irradiated light 106a from the backlight 102 is reflected by the finger 90, and reflected light 106b from the finger 90 is detected by the optical sensors 104. The detection result from the optical sensors 104 is sent to the touch detection section 11a, and it is possible to detect a touched position of the finger from which of the optical sensors 104 have detected reflected light from the finger 90, and detect movement of the finger based on change over time of the touched position.

Next, a method of changing shooting conditions, such as exposure correction and zooming, by changing operational modes to the touch panel 13, will be described using FIG. 3A to FIG. 5B. In this embodiment, changing of exposure correction is carried out by touching the right side of the screen 50 with one hand, changing of focal length (zooming) is carried out by touching both sides of the screen 50 with both hands and performing a rotation operation, and changing of aperture or shutter speed is carried out by touching both sides of the screen 50 with both hands and performing a slide operation.

Figure 3A:
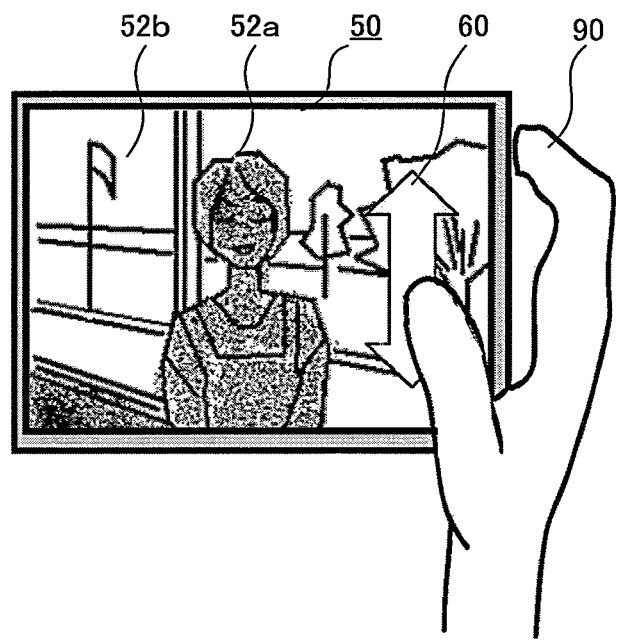
FIG. 3A and FIG. 3B are drawings showing appearance of carrying out exposure correction by touching a screen, in the digital camera of the first embodiment of the present invention.
Figure 3B:
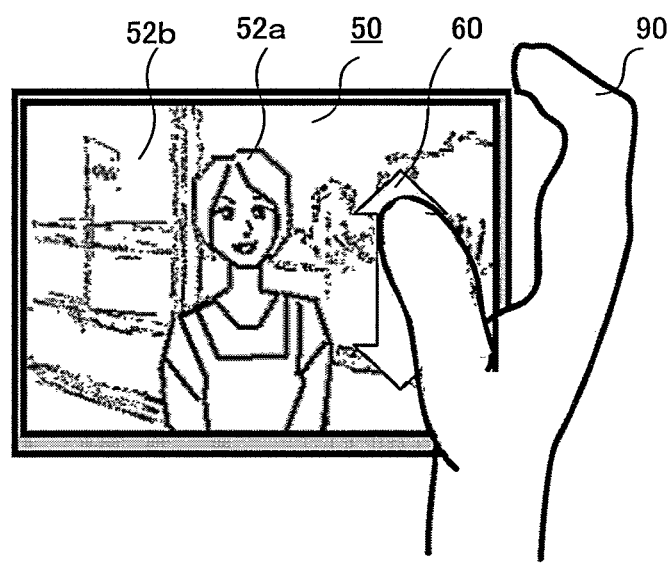

FIG. 3A and FIG. 3B show the case where a user holding the digital camera in one hand changes correction amount for exposure correction. Specifically, the camera is set in shooting mode, and a live view image is being displayed on the screen 50 of the display section 16. The live view image at this time is of a person 52a positioned in the center of a room, with outside scenery 52b spreading across the background. In this state, the person 52a who is in the middle is dark, and will be under exposed, while the background 52b will be properly exposed.

Generally, there will be many situations where exposure correction is carried out so as to give correct exposure for the person 52a positioned in the middle. Therefore, if the user touches the right side of the with one hand, an exposure bar 60 in a double arrow shape is displayed vertically on the right side of the screen 50, as shown in FIG. 3A. In this embodiment, as a result of a touch operation to the right side of the screen, it is predetermined that exposure correction will be set as the corresponding change condition.

If a touch to the right position is detected by the operation image display section 11c that is input with a detection signal from the touch panel 13, the change condition setting section 11b sets the type of the change condition type to "exposure". If "exposure" is set by the change condition setting section 11b, the operation image display section 11c instructs display of the exposure correction bar 60 as an operation guide image for assisting with the user's exposure correction operation, and image data for the compensation correction bar 60 is read out from the program/data storage section 12.

This read out image data for the exposure correction bar 60 is sent to the display control section 15, and the exposure correction bar 60 is superimposed on the live view image. Also, exposure correction, within the shooting condition items, is set as the change condition by the parameter change section 11d. With this embodiment, the exposure correction bar 60 is displayed in accordance with a touched position on the screen 50, but this is not limiting, and it is also possible to display the exposure correction bar 60 at a fixed position regardless of where the screen is touched.

As shown in FIG. 3A, if the exposure correction bar 60 is displayed superimposed on the live view image, the user can slide their finger along the exposure correction bar 60 in the direction in which they want to carry out exposure correction. The touch detection section 11a detects the direction of this slide operation, and this detection result is notified to the parameter change section 11d. The parameter change section 11d changes the exposure correction value in the positive direction when the direction of the slide operation is upwards, and changes the exposure correction value in the negative direction when the direction of the slide operation is downwards. In order to display the direction of exposure correction on the exposure correction bar 60 in a way that is easy to understand, it is also possible to display "+" and "−".

The parameter control section 11e receiving the change notification from the parameter change section 11d corrects brightness gain of the imaging section 20. As a result, as shown in FIG. 3B, in the live view image the person 52a in the middle of the screen becomes brighter, and is displayed clearly. On the other hand, the background 52b at the edges of the screen becomes over exposed, and is slightly blown out. There is also no problem in carrying out exposure correction by changing aperture value and shutter speed of the imaging section 20.

With this embodiment, conditions relating to the imaging section 20 have been changed by the parameter control section 11e, but depending on the type of change condition set it is also possible to change conditions of the imaging section 20. Also, the exposure control value is determined by the number of times a slide is performed, or by slide position. If the exposure correction value is determined using number of slides, then in the case of one upward slide, for example, it is made brighter by +0.5 of a step, and in the case of 3 upward slides made brighter by +1.5 steps. If the value is determined by slide position, for example, the highest position is made +2 steps.

Next, the case of a user who is holding the digital camera in both hands changing the focal length (zooming) will be described using FIG. 4A and FIG. 4B. If the fact that left and right sides of the screen 50 are being touched with two hands, and that a rotation operation has been carried out using both fingers, is detected by the touch detection section 11a, the change condition setting section 11b sets zooming as the type of change condition.

Figure 4A:
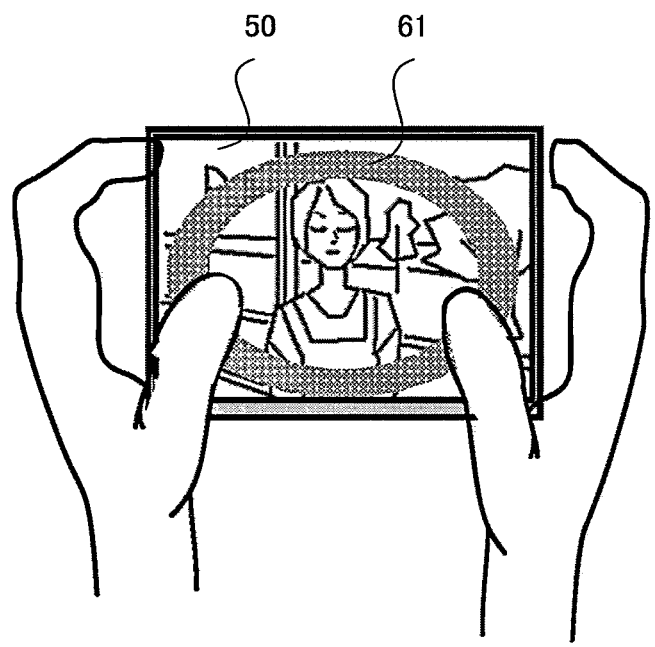
FIG. 4A and FIG. 4B are drawings showing appearance of carrying out zooming by touching the screen, in the digital camera of the first embodiment of the present invention.
Figure 4B:
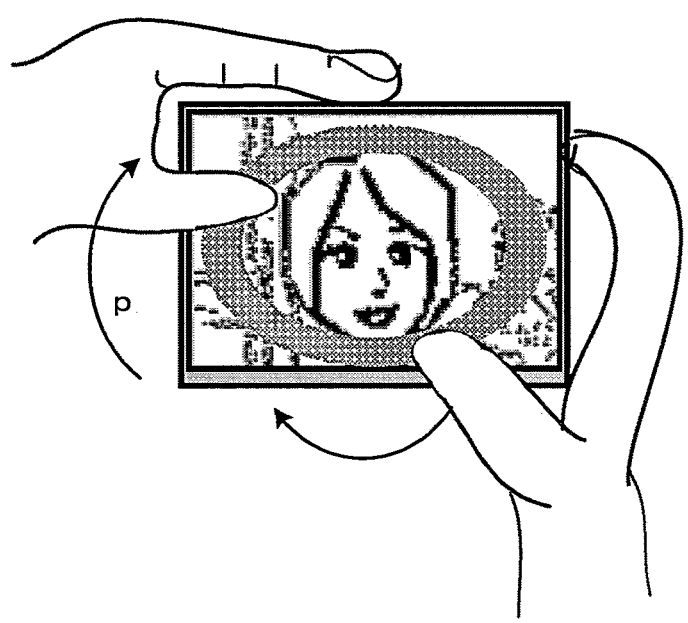

Next, as shown in FIG. 4A, the operation image display section 11c displays a graphic (object), that is a ring 61, on an ellipse, such as left and right touch positions made into an ellipse, as an operation guide image on the screen 50. Even if the left and right of the screen 50 is touched, in the case where only one of the left or right fingers has moved it is determined to be aperture/SS setting, which will be described later, and setting for zooming is not carried out. That is, in a state where both fingers are placed on the screen 50, since there are two options depending on the subsequent finger movement, an operation guide image is not displayed.

If the user performs a rotation operation by touching both fingers along the ring 62, as the operation guide image, the touch detection section 11a detects the rotational direction of the rotation operation, and the detected rotational direction is notified to the parameter change section 11d. If the rotational direction is clockwise, the parameter change section 11d notifies an instruction to increase the zoom parameter to the parameter control section 11e. On the other hand, if the rotational direction is counterclockwise an instruction to lower the zoom parameter is notified to the parameter control section 11e.

If the parameter control section 11e receives an instruction to increase the zoom parameter, a zoom lens of the imaging section 20 is turned in the direction to zoom up (long focus side), and the focal length of the optical system of the imaging section 20 is changed to the long focus side. Once the optical system has been zoomed up, the subject is enlarged and displayed as shown in FIG. 4B. On the other hand, if an instruction to reduce the zoom parameter is received, the zoom lens of the imaging section 20 is turned in a direction to zoom down (short focus side), and the focal length of the optical system of the imaging section 20 is changed to the short focus side.

Here, the amount of zooming up or zooming down is set according to an angle of rotation detected by the touch detection section 11a. For example, it is possible to change the focal length such that in the case of rotation of +90 degrees it is set to two times, and in the case of −90 degree rotation it is ½. As display of the ring 60, it is possible not only to display with the ring kept stationary, as described above, but to display a bright point on the ellipse corresponding to the finger position, and to carry out display such that this bright point rotates on an elliptical orbit in accordance with rotation of the finger. In this case, in a state where the focal length of the zoom lens has reached a long focal length end or a short focal length end, it is possible to notify that rotation of the finger has become invalid by stopping movement of the bright spot.

Also, as a modification of the zoom processing, it is also possible to performing trimming processing of a partial image in a specified range from the overall image using an electronic zoom processing section inside the image processing section 21, in accordance with an instruction of the parameter control section 11e. Specifically, a photographic zoom condition change can be any one of a change in focal length of a photographic lens, or an electronic zoom being on or off (magnification ratio change), or a combination of these.

With this embodiment, a ring shaped image has been adopted as the operation guide image for a zooming operation, but this is for the following reasons. With a single lens reflex camera, conventionally a zoom operation has often been executed by a rotation operation of a zoom ring of an interchangeable lens, and so it is easy to associate the zooming operation with the ring shaped operation guide image. In this way, with this camera there is an association between zooming and the ring, and so it is possible to improve discrimination by using an image of a ring shape in the operation guide image for zoom value change.

Next, the case of a user who is holding the digital camera in both hands changing aperture value or shutter speed (SS) will be described using FIG. 5A and FIG. 5B. If the left and right of the screen 50 being touched by both hands, and a slide operation being carried out by only one of the left or right fingers, is detected by the touch detection section 11a, the change condition setting section 11b sets aperture/SS (shutter speed) in the type of condition change.

With an aperture/SS condition change, the aperture value is adjusted by an aperture actuator that varies an opening radius of a mechanical aperture housed inside the imaging section 20. Also, shutter speed is controlled, in the case where there is a mechanical shutter inside the imaging section 20, by the timing of a drive actuator of the mechanical shutter, while in the case where there is not a mechanical shutter inside the imaging section 20 shutter speed of an electronic shutter of a CCD or CMOS image sensor is controlled.

If aperture/SS has been set by the change condition setting section 11b, the operation image display section 11c displays a TV icon 62a at the upper left side of the screen 50, or an AV icon 62b at the lower left of the screen 50, as the operation guide image. The TV icon 62a displaying TV is an icon for change of shutter speed, and the AV icon 62b displaying AV is an icon for changing aperture value. Conditions of whichever icon is touched are selected.

Figure 5A:
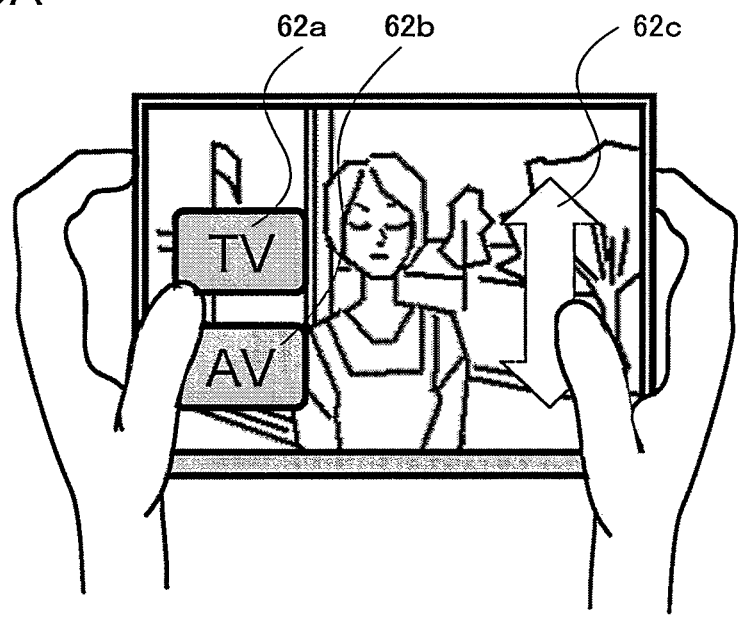
FIG. 5A and FIG. 5B are drawings showing appearance of carrying out change of aperture value or shutter speed by touching the screen, in the digital camera of the first embodiment of the present invention.

Also, as shown in FIG. 5A, a slide bar 62c is displayed on the right side of the screen 50 by the operation image display section 11c. This slide bar 62c is a vertically elongated arrow shape, and is an operation guide image for changing a parameter of whichever of aperture or SS is selected. In this embodiment, the TV icon 62a, AV icon 62b and slide bar 62c are displayed at touched positions. However, this is not limiting and it goes without saying that it is also possible to display these icons at set positions to the left and right.

Figure 5B:
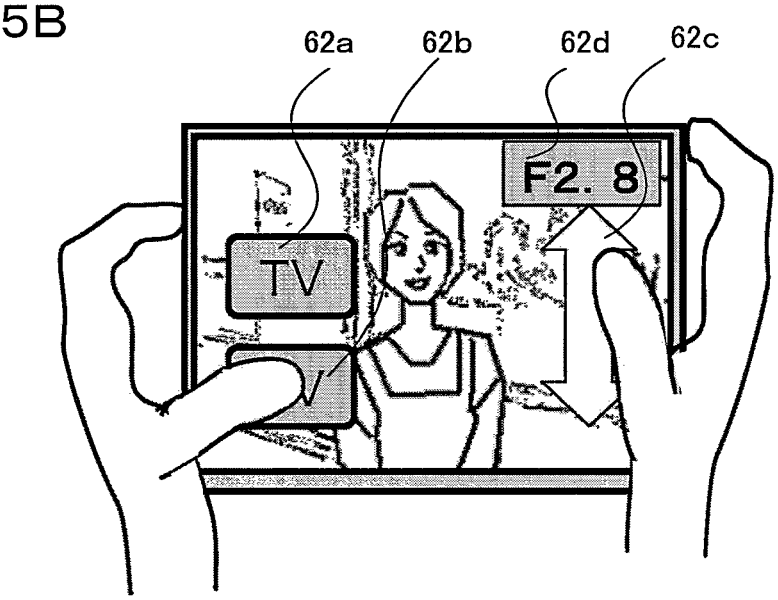

As shown in FIG. 5B, if the user touching the AV icon 62b with a finger of the left hand is detected by the touch detection section 11a and this is notified to the parameter change section 11d, the parameter change section 11d sets aperture change as the change condition. Next, if the touch detection section 11a detects that the user has performed a slide operation along the slide bar 62c to the upper side with a finger of the right hand, and this is notified to the parameter change section 11d, the parameter change section 11d sets F2.8, for example, as the aperture value. This set aperture value is displayed on an aperture/SS display section within the screen 50. The aperture value set in the parameter change section 11d is notified to the parameter control section 11e, and the aperture of the imaging section 20 is changed to F2.8 in accordance with instruction by the parameter control section 11e.

In this way it is possible in this embodiment to change the type of condition that will be changed according to differences in the manner of operation to the touch panel 13. Therefore, even with a touch panel of a small screen selection of condition type to be changed is made easy, and it is particularly effective for a touch panel of a mobile phone. It is possible to resolve the annoyance of selecting items on a menu of a small display section, such as exists in the related art.

Figure 6:
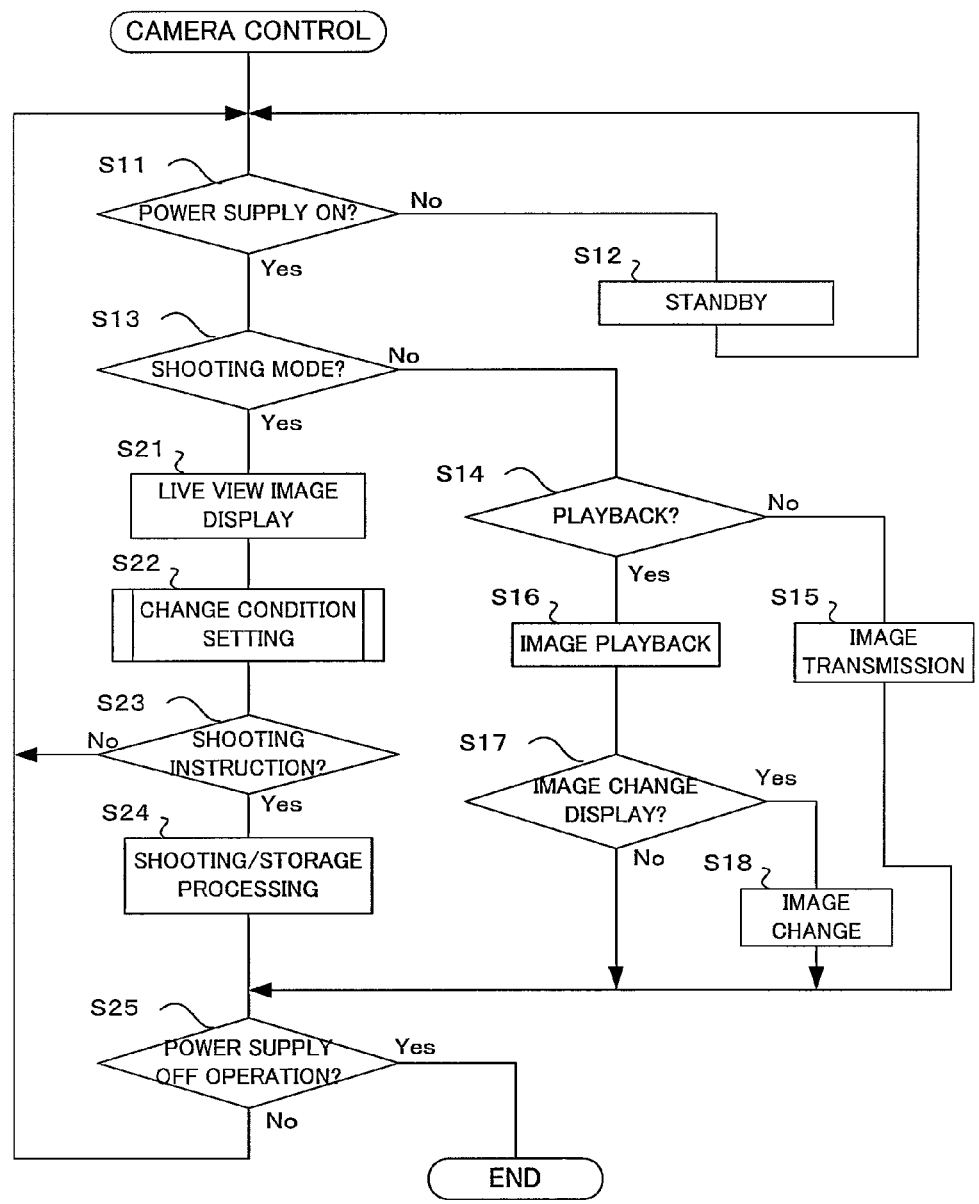
FIG. 6 is a flowchart showing camera control operations of the digital camera of the first embodiment of the present invention.

Next operation of the digital camera of the first embodiment will be described using the flowcharts shown in FIG. 6 to FIG. 10. FIG. 6 shows flow of camera control. If a power supply battery is loaded into this digital camera, the processing flow of this camera control commences, and first of all it is determined whether or not the power supply is on (S11). In this step the operational state of a power switch within the operation section 14 is detected, and it is determined whether or not this power switch is on.

If the result of determination in step S11 is that the power supply is not on, that is, that the power supply is off, a standby state is entered (S12). This standby state is a low power consumption mode, and is a state in which only the state of particular operations switches, such as the power supply switch, is detected, and other control is suspended. If the standby state is escaped from, processing returns to step S11. If the result of determination in step S11 is that the power switch is on, it is next determined whether or not the camera is in shooting mode (S13). Shooting mode is a mode where a subject image is observed, composition is decided, and it is possible to store a taken image by pressing the release button. If the result of this determination is that the camera is in shooting mode, then display of a live view image is carried out (S21). Here, the subject image is subjected to live view display on the display section 16 based on image data acquired by the imaging section 20.

If display of a live view image is carried out, setting of change conditions is next carried out (S22). In this step, as described using FIG. 3A to FIG. 5B, setting of change in various shooting conditions such as exposure correction or zooming is carried out by the user touching the screen 50, or performing a rotation operation or a slide operation using touch. Detailed processing flow for this change condition setting will be described later using FIG. 7.

Once change condition setting has been carried out, it is next determined whether or not there has been a shooting command (S23). In this step it is determined whether or not the release button, within the operation section 14, has been operated. If the result of this determination is that there is not a shooting command, processing returns to step S11. On the other hand, if there is a shooting command shooting and storage processing are carried out (S24). Here, image data acquired by the imaging section 20 is subjected to image processing by the image processing section 21, and further, after being compressed by the compression and expansion section 22, is stored in the image storage section 24 by the storage and playback section 23.

Once shooting and storage processing have been carried out, it is next determined whether or not there is a power supply off operation (S25). Here, it is determined whether or not the power switch has been turned off. If the result of this determination is that the power switch has not been turned off, processing returns to step S11. On the other hand, if the power supply has been turned off power off processing is carried out and an end state is entered.

If the result of determination in step S13 is not shooting mode, it is next determined whether or not the camera is in playback mode (S14). Here, determination is made based on the operational state of the playback button within the operation section 14. If the result of this determination is that the camera is in playback mode, playback of an image is carried out (S16). Image playback is the reading out of a taken image stored in the image storage section 24, and, after expansion in the compression and expansion section 22, display on the display section 16.

Once image playback has been carried out, it is next determined whether or not there is an image change command (S17). In the event that the user wishes to change an image to be appreciated, change of an image is instructed using an operation member of the operation section 14, and so in this step it is determined whether or not this operation member has been operated. If the result of this determination is that there is no image change instruction, processing advances to previously described step S25. On the other hand, if there is an image change instruction, an image change is carried out in accordance with this instruction. (S18). Here, the instructed image is displayed on the display section 16.

If the result of determination in step S14 is that the camera is not in playback mode, image communication is carried out (S15). Here, image data for a taken image stored in the image storage section 24 is transmitted to an external device such as a personal computer via the communication section 25, and image data is received from an external device. Once image communication is completed processing advances to step S25.

Figure 7:
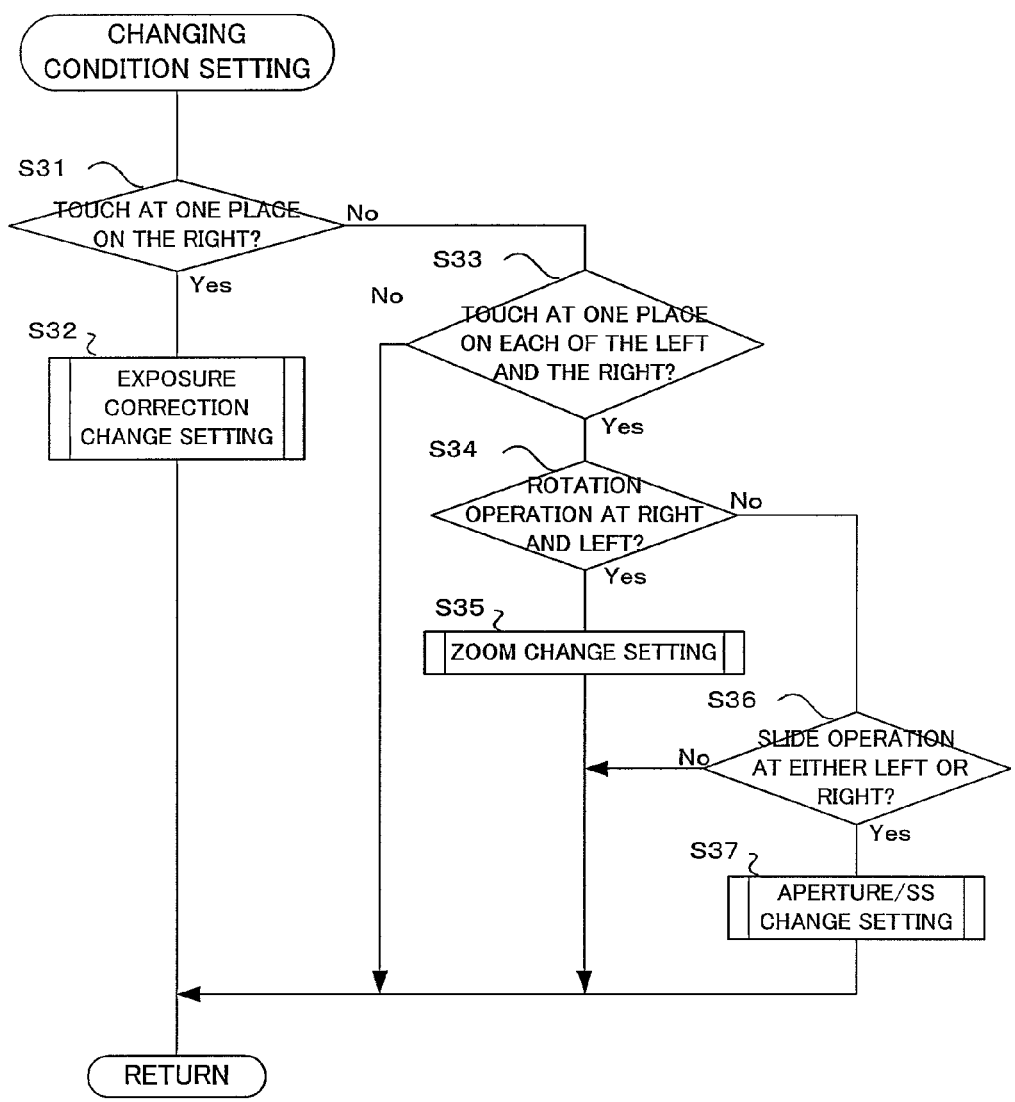
FIG. 7 is a flowchart showing operation of change condition setting for the digital camera of the first embodiment of the present invention.

Next, operation of operation of the change condition setting in step S22 will be described using the flowchart shown in FIG. 7. If the change condition setting operation is entered, it is first determined whether or not touching was at one place on the right (S31). Here, a search result from the touch panel 13 is input by the touch detection section 11a, and it is determined whether or not one place on the right of the screen 50 of the display section 16 is being touched. If the screen has been touch at one place on the left and right respectively, NO is determined here.

If the result of determination in step S31 is that the screen has been touched at one place on the right, exposure correction change setting is next carried out (S32). Here, change in an exposure correction amount is set in response to a user's input operation, as was described using FIG. 3A and FIG. 3B. A subroutine for this exposure correction change setting will be described later using FIG. 8. Once exposure correction change setting has been executed, processing returns to the originating flow.

If the result of determination in step S31 is that the screen has not been touched at one place on the right, it is next determined whether or not it has been touched at one place each on the left and the right (S33). Here, a search result from the touch panel 13 is input by the touch detection section 11a, and it is determined whether or not one place on the right and one place on the left of the screen 50 of the display section 16 are being touched. If the result of this determination is that the screen is not being touched at one place on the left and one place on the right, processing returns to the originating flow.

If the result of determination in step S33 is that the screen 50 is being touch at one place on both the left and right, it is then determined whether or not there is a rotation operation at the left and right (S34). If the result of determination in step S33 is Yes, then it is a state where the user is holding the digital camera in both hands, and in this step S34 whether or not the screen 50 has been touched so as to give respective rotation operations with a finger of both hands is further determined by the touch detection section 11a.

If the result of determination in step S34 is that there has been a rotation operation at the left and right, zoom change setting is carried out (S35). Here, change to the setting of focal length, namely zooming, is carried out in response to the user's rotation operation state, as described using FIG. 4A and FIG. 4B. A subroutine for this zoom change setting will be described later using FIG. 9. Once zoom change setting has been executed, processing returns to the originating flow.

If the result of determination in step S34 is that there was no rotation operation at the left and right, it is next determined whether or not there was a slide operation at either the left or right (S36). If the result of determination in step S33 is Yes, it is a state where the user is holding the digital camera with both hands, and since the result of determination in step S34 was that there were no rotation operations by the fingers of both hands, in this step whether or not there is a slide operation on the screen 50 with either the left or right finger is determined by the touch detection section 11a.

If the result of determination in step S36 is that there was no slide operation at either the left or right, processing returns to the originating flow. On the other hand, if the result of determination is that there has been a slide operation at either the left or right, aperture/SS change setting is next carried out (S37). Here, as described using FIG. 5A and FIG. 5B, for aperture or shutter speed selected by the finger of the right hand of the user, change of setting for an aperture value or shutter speed is carried out in response to the slide operation state of the finger of the right hand. A subroutine for this aperture/SS change setting will be described later using FIG. 10. Once aperture/SS change setting has been executed, processing returns to the originating flow.

Figure 8:
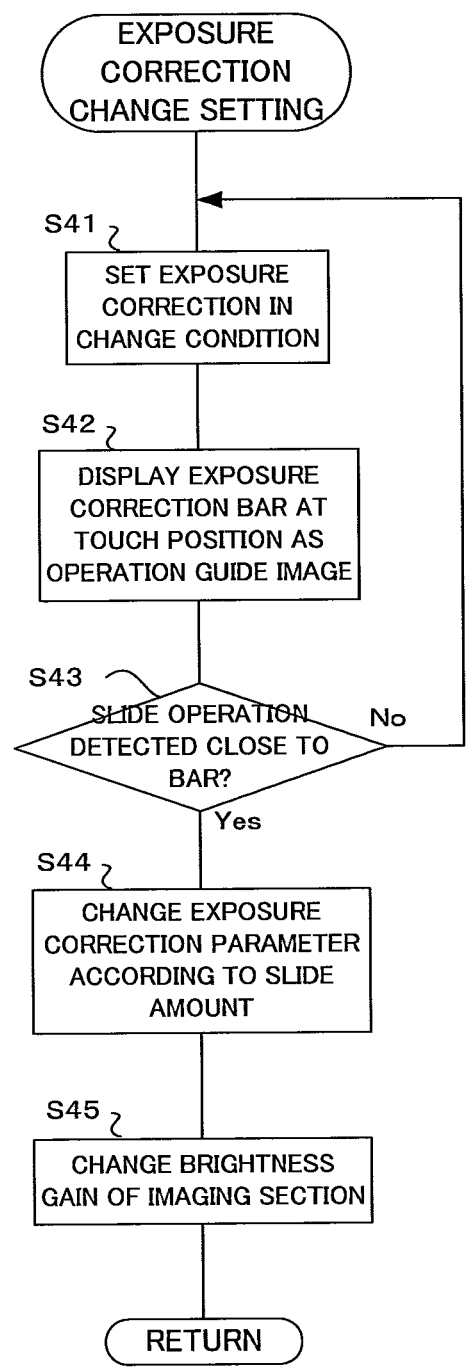
FIG. 8 is flowchart showing operation of exposure correction change setting for the digital camera of the first embodiment of the present invention.

Next, the subroutine for the exposure correction change setting of step S32 (refer to FIG. 7) will be described using the flowchart shown in FIG. 8. If the processing flow for exposure correction change setting is entered, exposure correction is first set in change condition (S41). Here, exposure correction is set as the change condition by the change condition setting section 11b.

Next, an exposure correction bar is displayed at a touch position, as an operation guide image (S42). As shown in FIG. 3A, the operation image display section 11c displays the exposure correction bar 60 on the screen 50 at a position touched by the user. It is then determined whether or not a slide operation has been detected close to the bar (S43). Here, it is detected by the touch detection section 11a whether or not the user's finger is touching in a vertical direction in the vicinity of the exposure correction bar 60.

If the result of determination in step S43 is that a slide operation was not detected, step S41 is returned to. On the other hand, if a slide operation was detected, a parameter for exposure correction is then changed in response to the slide amount (S44). Here, the exposure correction amount is changed by the parameter change section 11d in response to the slide amount detected by the touch detection section 11a.

Once the exposure correction parameter has been changed, brightness gain of the imaging section 20 is changed by the parameter control section 11e (S45). Once the exposure correction amount has been changed, the person 52a shown in FIG. 3A will become brighter, as shown in FIG. 3B, and is displayed clearly. On the other hand, the background 52b at the edges of the screen becomes over exposed, and is slightly blown out. As well as changing the gain of the imaging section 20, it is also possible, as described previously, to change the aperture value or shutter speed of the imaging section 20. Once the gain has been changed, original processing flow is returned to.

Figure 9:
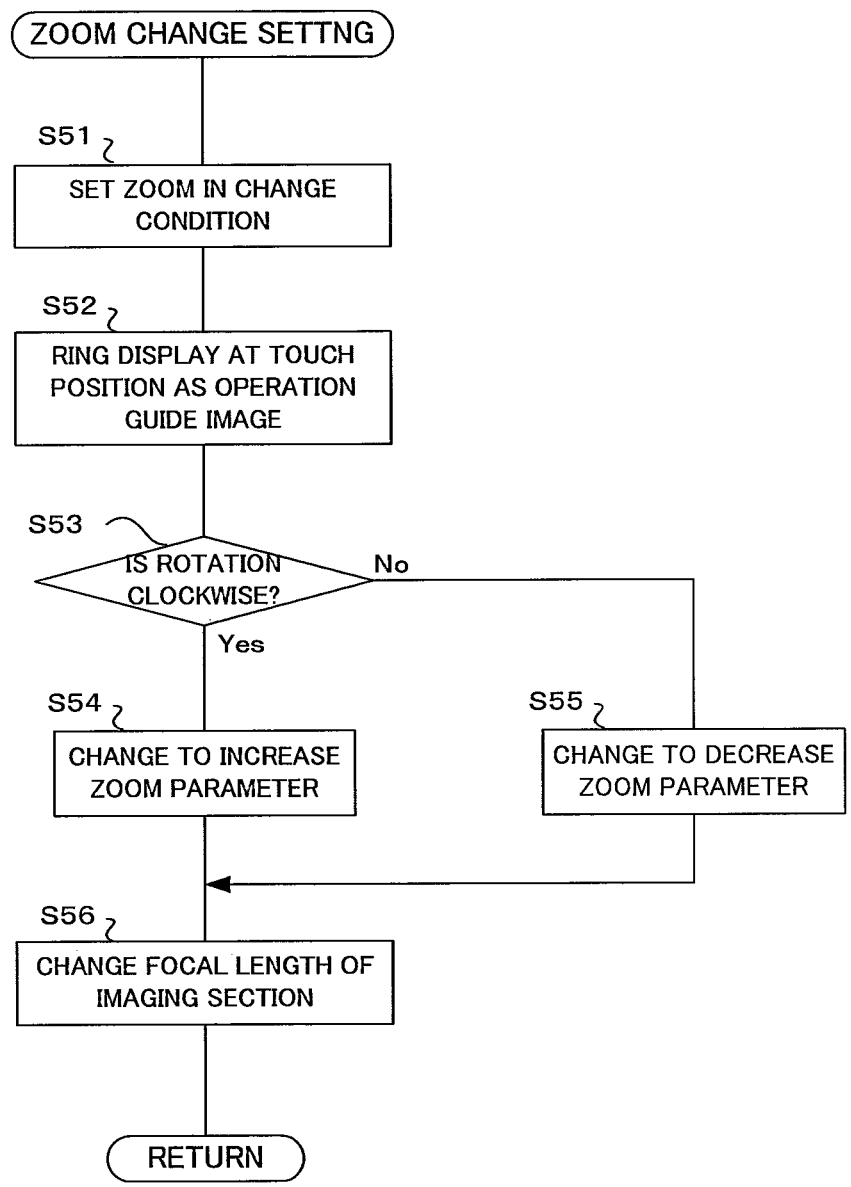
FIG. 9 is a flowchart showing operation of zoom change setting for the digital camera of the first embodiment of the present invention.

Next the zoom change setting subroutine of step S35 (refer to FIG. 7) will be described using the flowchart shown in FIG. 9. If the processing flow for zoom correction change setting is entered, zoom correction is first set as a change condition (S51). Here, zoom is set as the change condition by the change condition setting section 11b.

Next, a ring is displayed at a touch position, as an operation guide image (S52). As shown in FIG. 4A, the operation image display section 11c displays the ring 61, which forms an ellipse from two positions that have been touched by fingers of both hands of the user, on the screen 50. Next it is determined whether or not rotation is clockwise (S53). Here, at the circumference of the ellipse of the ring 61, it is detected by the touch detection section 11a whether or not the user's finger is touching in a clockwise direction along the ellipse.

If the result of determination in step S53 is that rotation is clockwise, the parameter change section 11d then carries out a change to increase the zoom parameter (S54). On the other hand, if the rotation is not clockwise, that is, it is counter-clockwise, the parameter change section 11d carries out a change to decrease the zoom parameter (S55).

Once the zoom parameter change has been carried out in step S54 or step S55, the focal length of the imaging section 20 is changed (S56). Here, the focal length of the optical system of the imaging section 20 is changed by the parameter control section 11e in the direction of zooming up or zooming down that was set by the parameter change section 11d. The zoom up amount or zoom down amount at this time is set in response to the rotational angle detected by the touch detection section 11a, as described previously. Once the focal length of the imaging section has been changed, original processing flow is returned to.

Figure 10:
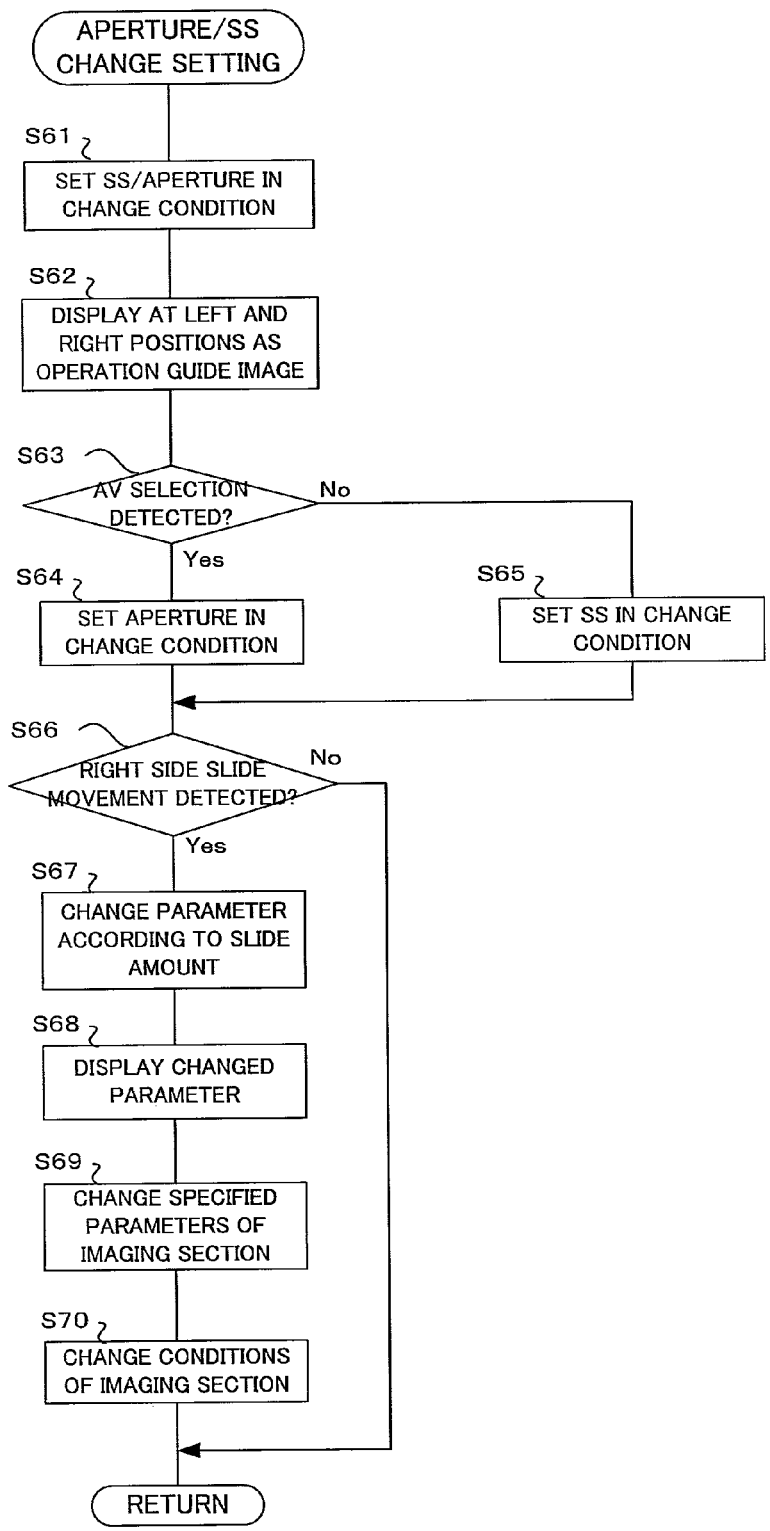
FIG. 10 is a flowchart showing operation of aperture/SS change setting for the digital camera of the first embodiment of the present invention.

Next the aperture/SS change setting subroutine of step S37 (refer to FIG. 7) will be described using the flowchart shown in FIG. 10. If the processing flow for aperture/SS change setting is entered, aperture/SS is first set in the change condition (S61). Here, aperture and shutter speed are set as the change conditions by the change condition setting section 11b.

Next, AV and TV icons are displayed at left and right touch positions, as operation guide images (S62). As shown in FIG. 5A, the operation image display section 11c displays the TV icon 62a and the AV icon 62b at touch positions of the left side on the screen 50, and displays the slide bar 62c at a touch position on the right side. Next, it is determined whether or not AV selection has been carried out (63). Here, it is detected by the touch detection section 11a whether or not an area close to the AV icon 62b has been touched.

If the result of determination in step S63 is that there has been AV selection, the change condition setting section 11b sets aperture as the change condition (S64). On the other hand, if the result of determination is that there has not been AV selection, namely that the TV icon 62a has been selected, the change condition setting section 11b sets SS (shutter speed) as the change condition (S65).

Once the change condition has been set in step S64 or step S65, it is next determined whether or not a slide motion (right slide motion) at the right side of the screen has been detected (S66). Here, the touch detection section 11a determines if the user's finger is not touching the screen 50 along the slide bar 62c. If the result of this determination is that a right slide motion has not been detected, the originating processing flow is returned to.

On the other hand, if the result of determination in step S66 is that a right slide motion has been detected, a parameter is changed in response to the slide amount (S67). Here, the parameter change section 11d changes the aperture value or the shutter speed (SS) in response to the slide amount detected by the touch detection section 11a. The changed parameter is then displayed (S68). Here, as described previously, by displaying on the aperture/SS display section 62d (refer to FIG. 5B), the user can recognize that changed aperture value and shutter speed.

Next, specified parameters of the imaging section are changed (S69). Here, the parameter control section 11e carries out change of parameters (control values) for the aperture or shutter speed. Conditions of the imaging section 20 are then changed (S70). Here the aperture or shutter speed value of the imaging section 20 is replaced with the changed value, and at the time of shutter release control is carried out in accordance with the changed value. Once the imaging section conditions have been changed, original processing flow is returned to.

In the first embodiment of the present invention as described above, it is possible to easily set whether any conditions, such as exposure correction or zoom value for example, are to be changed in response to a state of touching on the panel 13. The screen does therefore not become confusing even with a touch panel of a small screen.

Also with this embodiment, operation guide images are displayed in accordance with the changed condition. It is therefore possible for a user to easily carry out setting of parameters in line with the operation guide images.

With this embodiment, at the time of carrying out zoom change setting, this setting is carried out when the screen 50 is being touched at one place on each of the left and right sides, and a rotation operation is carried out simultaneously at the left and right. However, there is no problem in having a configuration where even if a rotation operation is not carried out simultaneously at the left and right, zoom change setting is carried out if there is a rotation operation at either side, as long as the screen is being touched at one place on each of the left and right sides. In this case, it is possible to determine "Has there been a rotation operation at either the left or right?" in step 34 (refer to FIG. 7). It is also possible to perform zoom change setting even in the event that there is a rotation operation with the screen being touched at one place on either the left or the right. Also, although an ellipse corresponding to a horizontally long screen has been described as an operation guide image, it is not limited to an ellipse and can be a circle.

Next, a second embodiment of the present invention will be described using FIG. 11. With the first embodiment, even if respective fingers of both hands were placed on the screen 50, whether it is zoom or aperture/SS was not decided until an operation is carried out the next time. With the second embodiment however, which of zoom or aperture/SS it is can be differentiated by the initial nature of the touch. The structure of the second embodiment is the same as the first embodiment, and apart from the point that the change condition setting flowcharts show in FIG. 7 is changed to the flowchart shown in FIG. 11, the flowcharts are also the same as the first embodiment. Here description will concentrate on points of difference.

Figure 11:
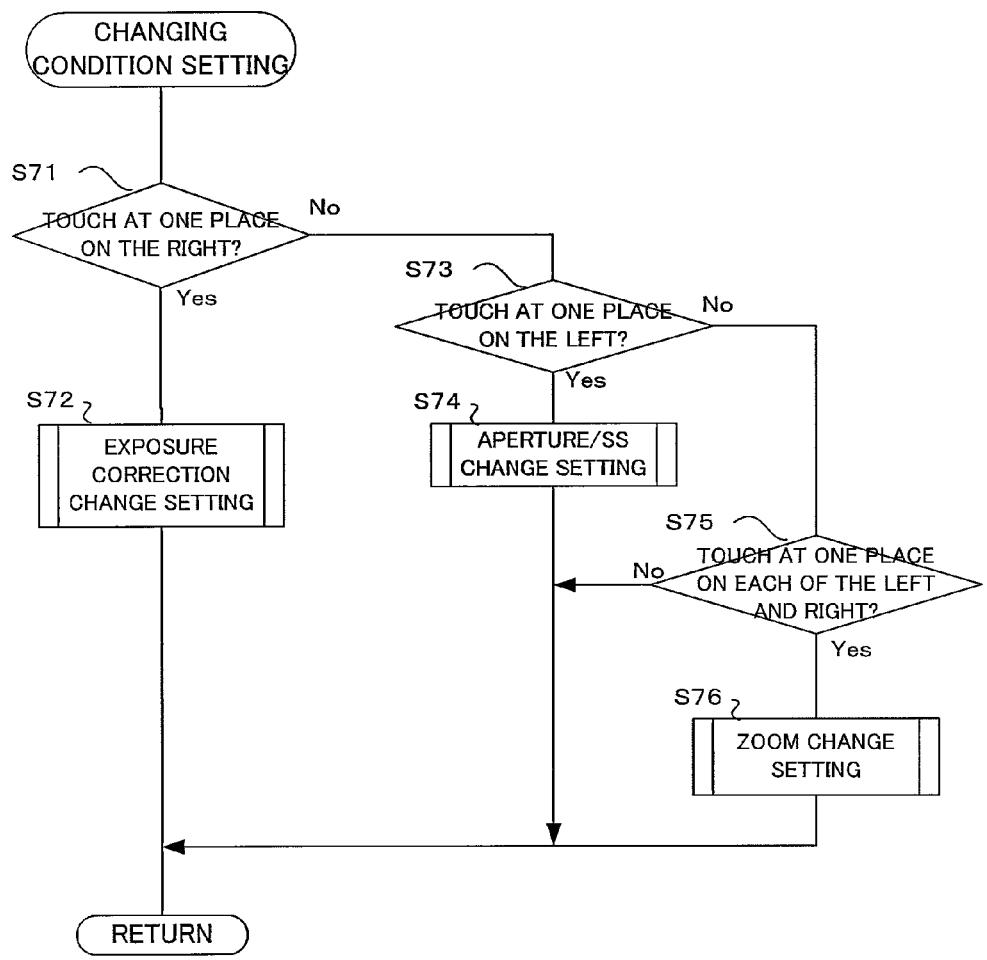
FIG. 11 is a flowchart showing operation of change condition setting for a digital camera of a second embodiment of the present invention.

If the processing flow for change condition setting shown in FIG. 11 is entered, it is first determined whether or not touching is at one place on the right (S71). Here, similarly to step S31 it is determined by the touch detection section 11a whether or not one place on the right of the screen 50 is being touched. If the result of this determination is that the touching is at one place on the right, then similarly to S32 exposure correction change setting is carried out (S72). This processing flow for exposure correction change is the same as the processing flow of the first embodiment shown in FIG. 8, and so description thereof is omitted. Once exposure correction change setting has been executed, processing returns to the originating flow.

If the result of determination in step S71 is that the screen has not been touched at one place on the right, it is next determined whether or not the touching is at one place on the left (S73). Here, it is determined by the touch detection section 11a whether or not one place on the left of the screen 50 is being touched. If the result of this determination is that one place on the left is being touched, next, similarly to step S37, aperture/SS change setting is carried out (S74). This processing flow for aperture/SS change is the same as the processing flow of the first embodiment shown in FIG. 10, and so description thereof is omitted. Once aperture/SS change setting has been executed, processing returns to the originating flow.

If the result of determination in step S73 is that the screen has not been touched at one place on the left, it is next determined whether or not the screen has been touched at one place on each of the left and right sides, similarly to step S33 (S75). Here, it is determined by the touch detection section 11a whether the screen is being touched at one place on both the left and right sides at the same time. If the result of this determination is that the screen is not being touched at one place on the left and one place on the right, processing returns to the originating flow. On the other hand, if the result of determination is that the screen is being touched at one place on the left and one place on the right, then similarly to step S35 zoom change setting is carried out (S76). This processing flow for zoom change is the same as the processing flow of the first embodiment shown in FIG. 9, and so description thereof is omitted. Once zoom change setting has been executed, processing returns to the originating flow.

As described above, with the second embodiment of the present invention change of zoom or aperture/SS can be discriminated by the initial manner of touching. Specifically, in the case where there was touching at one place on the left in step S73, aperture/SS change setting is immediately executed, and in the case where there is no touching at one place on the left zoom change setting is executed after it has been confirmed that one place on the left and one place on the right are being touched at the same time. It is therefore possible to rapidly transition to the next operation.

Figure 12A:
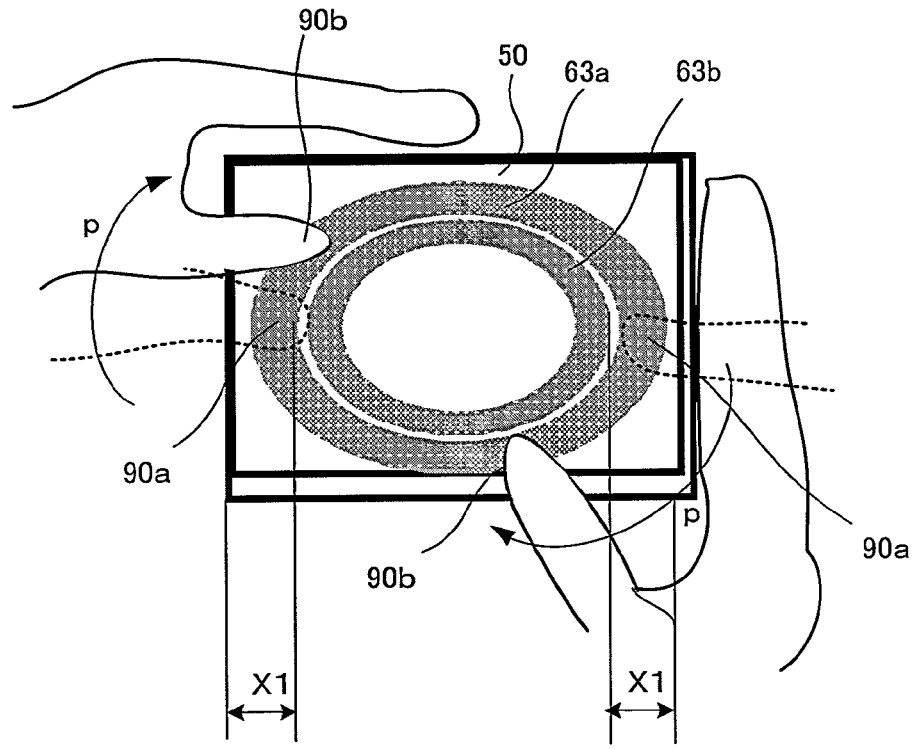
FIGS. 12A and 12B are drawings showing appearance of inputting conditions by rotating the screen, with the digital camera of the thirds embodiment of the present invention.

Next, a third embodiment of the present invention will be described using FIG. 12A, FIG. 12B and FIG. 13. In the first embodiment, a single ring 61 was used to set zoom in the change condition. In the third embodiment rings of differing diameter are displayed as operation guide images, and it is possible to change respectively different conditions. The structure of the third embodiment is the same as the first embodiment, and apart from the point that the change condition setting flowchart shown in FIG. 7 is changed to the flowchart shown in FIG. 13, the flowcharts are also the same as the first embodiment. Here description will concentrate on points of difference.

Before giving a description of the flowchart shown in FIG. 13, the manner of changing parameters using an example of ring display of this example will be described using FIG. 12A and FIG. 12B. FIG. 12A shows the appearance when graphics (objects) of an outer ring 63a and an inner ring 63b are displayed on the screen 50 by the operation image display section 11c, and a finger of each hand of the user is touching the screen so as to respectively rotate along the outer ring 63a.

At this time, in the case where fingers 90a shown by dotted lines are placed on the left and right of the screen 50, and moved in the direction p, which is a clockwise direction, along the outer ring 63a, in other words, when moving towards the positions of the fingers 90b shown by solid lines, and when the tips of left and right fingers are at the end of the screen (left and right both within the range X1), the change conditions is set to zoom change by the change condition setting section 11b. The above described range X1 can be a numerical value of about ⅛th of the overall screen width, but it can also be appropriately changed in accordance with aspect ratio of the screen etc.

The touch detection section 11a detects the amount of rotation at this time, and control is exerted such that a change is performed to increase the zoom parameter by the parameter change section 11d depending on the angle of this rotation operation, and the focal length of the imaging section 20 is moved to the long focal length by the parameter control section 11e. Also, if the finger 90a is moved so as to rotate in a counter clockwise direction along the outer ring 63a while touching, a change is performed to increase the zoom parameter depending on the angle of the rotation operation at this time. Control is then exerted to move the focal length of the imaging section 20 to a short focal length using the parameter control section 11e.

Figure 12B:
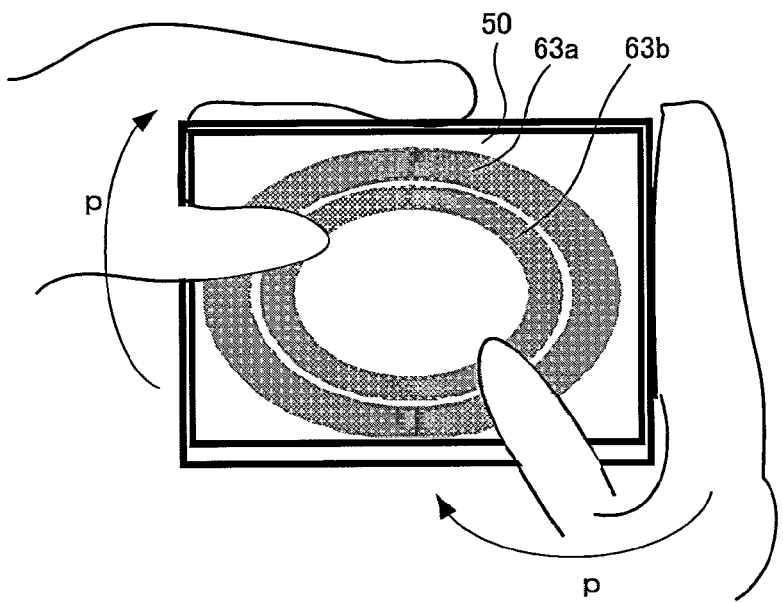

FIG. 12B shows the appearance when a finger of each hand is placed on the inner ring 63b of the screen 50, touching so as to respectively rotate along the inner ring 63b. If the positions where the left and right fingers are initially placed are respectively further in than the previously mentioned X1 and the fact that a rotation operation has started is detected, the change condition is set to a change operation for focus position by the change condition setting section 11b.

In the case where the touch detection section 11a detects rotation direction and rotation amount at this time, and this rotation direction is a clockwise direction (direction p in the drawing), a focus parameter is set to close range by the parameter change section 11d, and changed to a specified close range value depending on the angle of the rotation operation. Also, in the case where the rotation direction is counterclockwise (direction opposite top in the drawing), the focus parameter is set to long-distance by the parameter change section 11d, and changed to a specified long-distance value depending on the angle of the rotation operation.

The parameter control section 11e carries out movement of a focus lens of the imaging section 20 to a close range side or a long-distance side in accordance with either close range and a close range value, or long-distance and a long distance value, set by the parameter change section 11d.

Next, operation of change condition setting in this embodiment will be described using the flowchart shown in FIG. 13. In the change condition setting in this embodiment, steps S31 to S34, S36 and S37 are the same as those in the processing flow for change condition setting shown in FIG. 7 for the first embodiment, and so steps that carryout the same processing will be assigned the same step numbers, and detailed description thereof is omitted.

Figure 13:
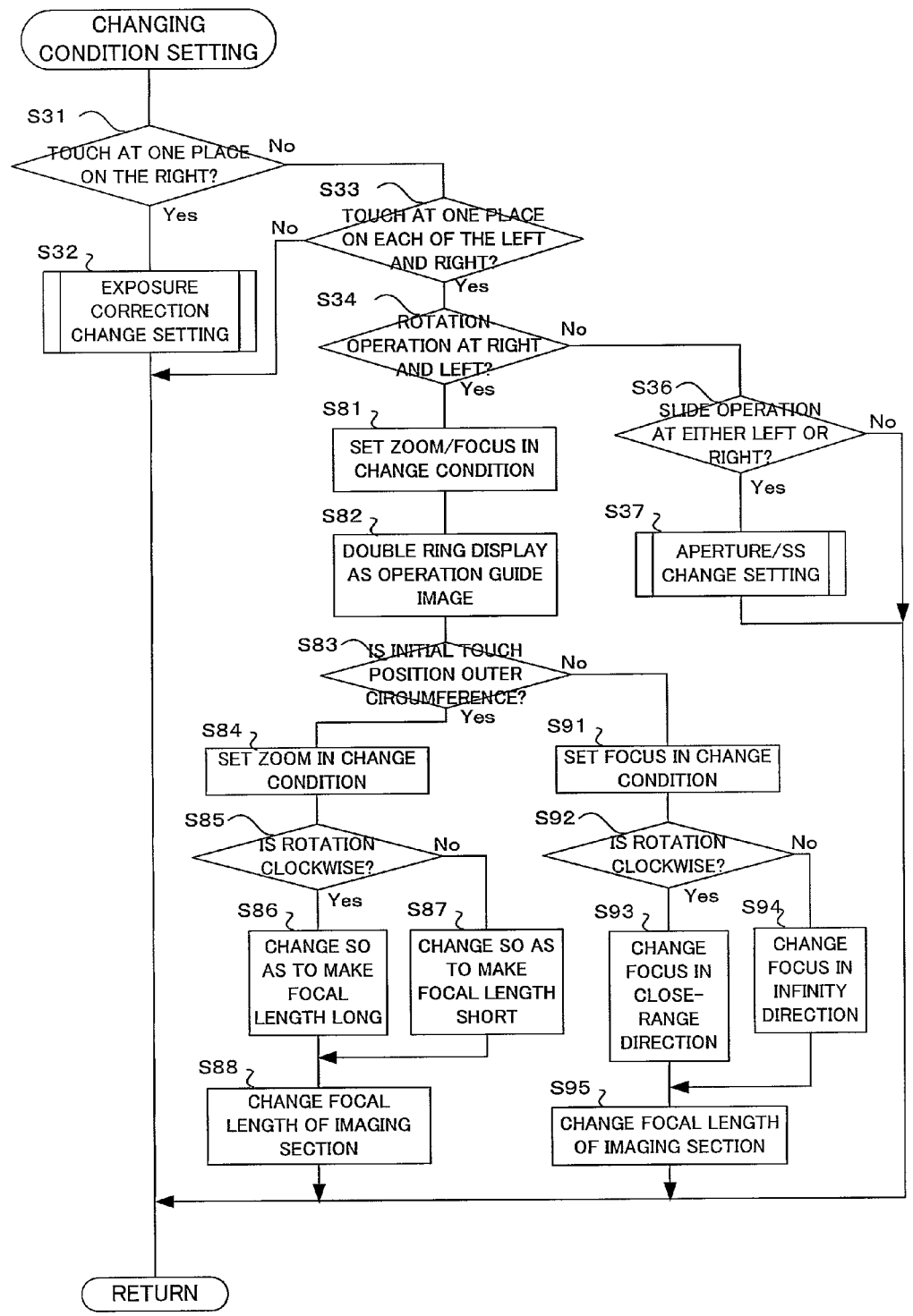
FIG. 13 is a flowchart showing operation of change condition setting in a digital camera of a third embodiment of the present invention.

The change condition setting shown in FIG. 13 is entered, and in step S34 it is determined whether or not a rotation operation has been performed at the left and right, and in the event that a rotation operation has been performed at the left and right zoom/focus is next set in the change condition (S81). Specifically, if the screen 50 being touched on the left and right at the same time is detected by the touch detection section 11a, zoom/focus is set in the change condition by the change condition setting section 11b.

Next, a double ring is displayed as an operation guide image (S82). Here, an outer ring 63a and an inner ring 63b are displayed on the screen 50 of the display section 16 by the operation image display section 11c. Next, it is determined whether or not the initial touch position is the outer ring (S83). Here, the initial touch position is detected by the touch detection section 11a, and it is determined whether or not this position is within the ranged X1 in FIG. 12A. If the touch position is within the range X1, it is determined as being the outer ring.

If the result of determination in step S83 is that the initial touch position is the outer ring, zoom is set in the change condition, by the change condition setting section 11b (S84). It is then determined whether or not the rotation is clockwise (S85). Here, determination is carried out based on the detection result by the touch detection section 11a. If the result of detection is that the rotation direction is clockwise, change is performed by the parameter change section 11d so that the focal length becomes long (S86). On the other hand, if the result of determination in step S85 is that the rotation is not clockwise, that is, that the rotation is counter clockwise, change is carried out by the parameter change section 11d so that the focal length becomes short (S87).

Once change in focal length has been carried out in step S86 or S87, the focal length of the imaging section 20 is changed (S88). Here, the zoom lens of the imaging section 20 is moved to the close range side or the long-distance side by the parameter control section 11e, in accordance with the change result by the parameter change section 11d. Once change in the focal length of the imaging section has been performed, original processing flow is returned to.

If the result of determination in step S83 is that the initial touch position is not the outer ring, that is, that the touch position is the inner ring, focus is set in the change condition, by the change condition setting section 11b (S91). It is then determined whether or not the rotation is clockwise (S92). Here, determination is carried out based on the detection result by the touch detection section 11a.

If the result of determination in step S92 is that rotation is clockwise, the parameter change section 11d then changes focus in the close-range direction (S93). On the other hand, if the result of determination in step S92 is that the rotation is not clockwise, namely that the rotation is counter clockwise, focus is changed in the infinity direction (long-distance direction) by the parameter change section 11d (S94).

Once the change in direction of focus has been carried out in step S93 or step S94, focus of the imaging section 20 is then changed (S95). Here, the focus lens of the imaging section 20 is moved to the close range side or the long-distance side by the parameter control section 11e, in accordance with the change result by the parameter change section 11d. Once change in the focus of the imaging section has been performed, original processing flow is returned to.

As has been described above, with the third embodiment of the present invention, since there are two rings, it is possible to selectively change two types of parameter with a rotation operation of differing radius.

With this embodiment, even if a finger is placed either slightly off-center or at the side of the screen 50, the two rings, being the outer ring 63a and the inner ring 63b, are always displayed, but it is also possible to display only one of the rings depending on the position where a finger is placed.

Also, there are two rings with this embodiment, but this is not limiting and it is also possible to have three or more rings. In the case of three rings, it is possible to selectively change even more conditions.

Next a fourth embodiment of the present invention will be described using FIG. 14A to FIG. 16. In the third embodiment, a plurality of rings were displayed in concentric circles as operation guide images. With this fourth embodiment the centers of a plurality of rings are arranged offset. The structure of the second embodiment is the same as the first embodiment, and apart from the point that the change condition setting flowchart show in FIG. 7 is changed to the flowchart shown in FIG. 16, the flowcharts are also the same as the first embodiment. Description will therefore concentrate on points of difference.

Figure 14A:
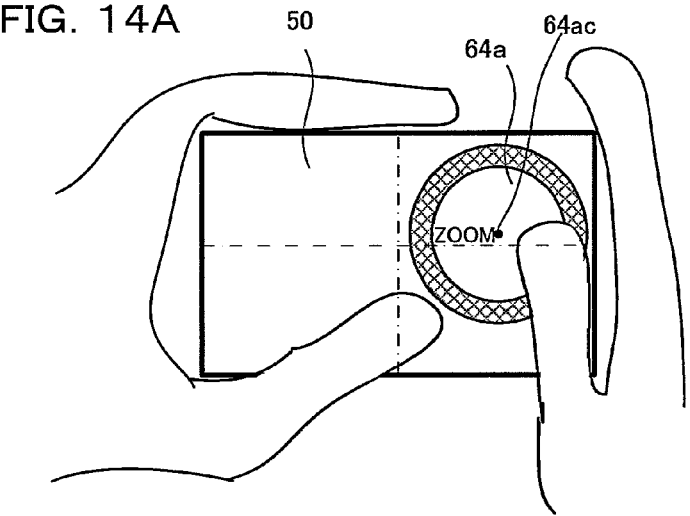
FIG. 14A to FIG. 14C are drawings showing appearance of changing input conditions by touching the screen with both fingers, with a digital camera of a fourth embodiment of the present invention.
Figure 16:
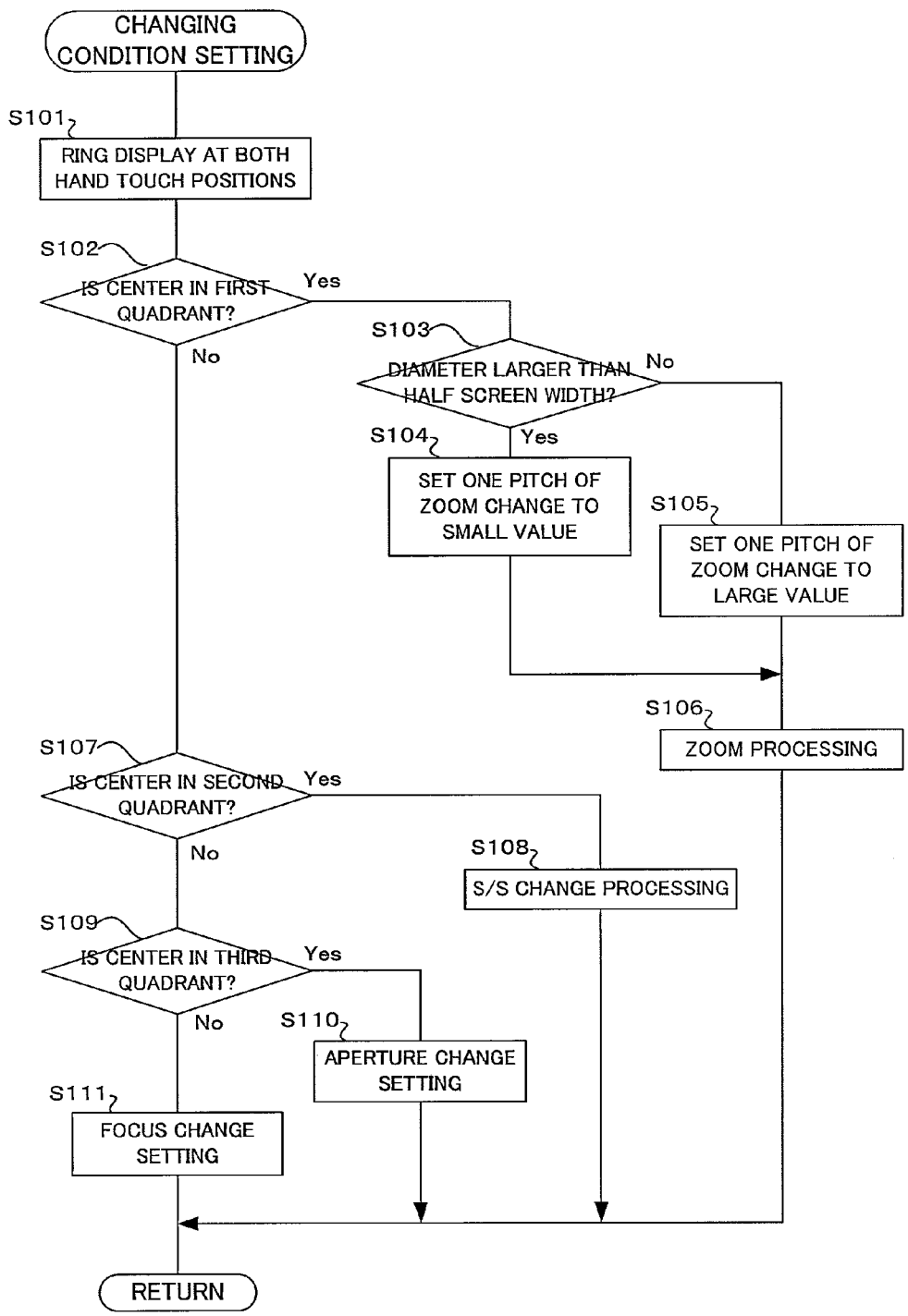
FIG. 16 is a flowchart showing operation of change condition setting in the digital camera of the fourth embodiment of the present invention.

Before giving a description of the flowchart shown in FIG. 16, the manner of changing parameters using an example of ring display of this embodiment will be described using FIG. 14A and FIG. 14C. FIG. 14A is a drawing showing appearance of setting zoom as a change condition, when fingers of both hands are respectively touching the upper right part of the screen 50 at the same time. Specifically, if touching with both fingers at the same time at the upper right (first quadrant) of the screen 50 is detected by the touch detection section 11a, zoom is set as the type of change condition by the change condition setting section 11b.

Using the operation image display section 11c, a graphic (object) for a circle 64a passing through two touch positions is then displayed on the screen 50. Also "zoom" is displayed in the center 64ac of the circle 64a, as a change condition name. Similarly to the other embodiments, if both the user's fingers are moved along the circle 64a while touching, the focal length is changed. Here, If this rotation operation direction is clockwise, zoom up is carried out, and conversely if the rotation operation direction is counter clockwise zoom down is carried out.

Figure 14B:
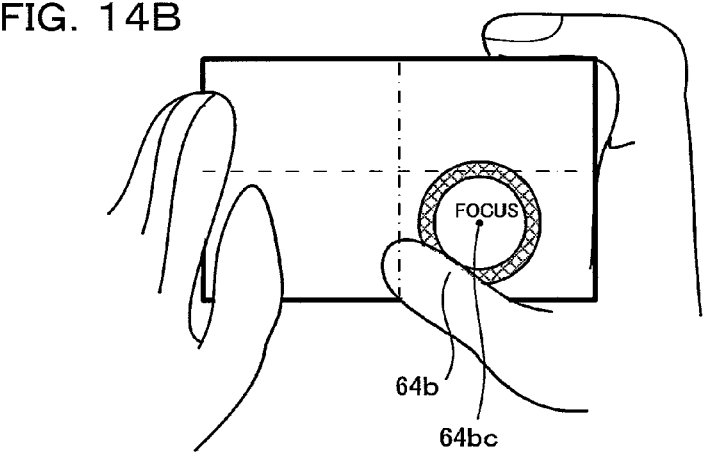

FIG. 14B is a drawing showing appearance of setting focus as a change condition, after the bottom right of the screen 50 has been touched by both fingers of both hands at the same time. Specifically, if touching with both fingers at the same time at the lower right (fourth quadrant) of the screen 50 is detected by the touch detection section 11a, focus is set as the type of change condition by the change condition setting section 11b.

Using the operation image display section 11c, a graphic (object) for a circle 64b passing through the two touch positions is then displayed on the screen 50. "focus" is also displayed in the center 64bc of the circle 64a, as a name of the change condition. If both the user's fingers are moved along the circle 64b while touching, focus is changed. Here, if this rotation operation direction is clockwise, focus becomes close range, and conversely if the rotation operation direction is counter clockwise focus becomes long-distance.

Figure 14C:
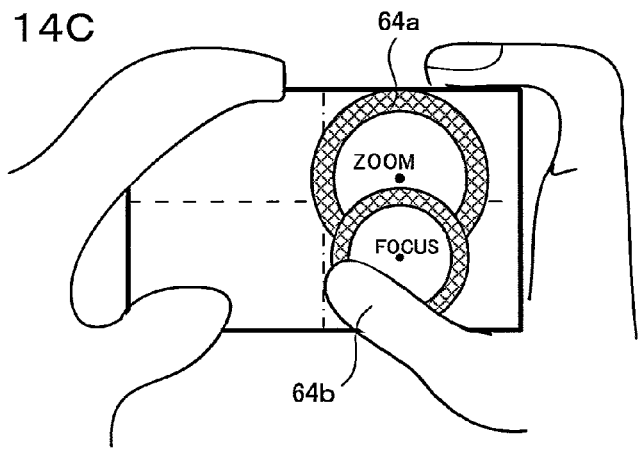

FIG. 14C shows an example of a screen on which both the zoom circle 64a and the focus circle 64b are displayed. After the graphic (object) for the zoom circle 64a has been displayed in FIG. 14A, if a specified time (for example 1 second) elapses with nothing happening the circle 64a is deleted, but if the position of the two fingers is moved downwards within the specified time and a rotation operation carried out again, the focus circle 64b is displayed overlaid in addition to the zoom circle 64a. There is no problem if the two circles intersect.

The order of selecting zoom and focus can obviously be reversed, and it is also possible for the number of circles to be displayed to be three or more. For example, it is possible to divide the entire screen 50 into four, to give four regions of upper right (first quadrant), upper left (second quadrant), lower left (third quadrant) and lower right (fourth quadrant), and display respectively independent circles as operation guide images. The processing flow shown in FIG. 16, which will be described later, is an example to display these four circles.

Figure 15:
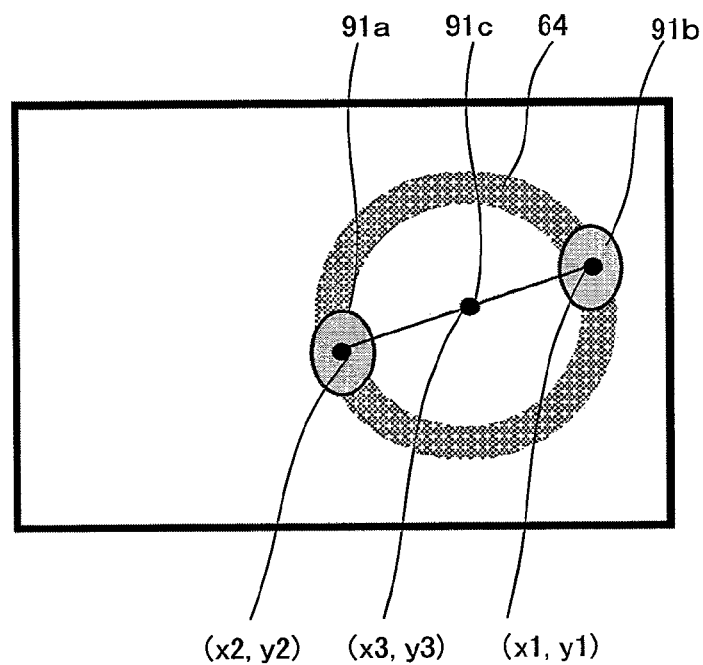
FIG. 15 is a drawing showing appearance of changing the diameter of a ring in correspondence with a spacing between fingers when the screen has been touched with both hands, in the digital camera of the fourth embodiment of the present invention.

Next, a method of calculating radius and center position of a circle that is displayed from the position of both fingers that have touched the screen 50 will be described using FIG. 15. In FIG. 14, the change condition setting section 11b sets a type of position change condition that has been touched, and the method of setting the circles at this time will be described.

Coordinates of the approximate center of a position 91a that has been touched by the right finger, detected by the touch detection section 11a, are made (x1, y1), and coordinates of the approximate center of a position 91b touched by the left finger are made (x2, y2). At this time the touch detection section 11a calculates the radius R of the circle and coordinates (x3, y3) of the center 91c of the circle based on equations (1) to (3) below.

$$R = (((x1-x2)^2 + (y1-y2)^2)^{0.5})/2 \quad (1)$$

$$x3 = (x1+x2)/2 \quad (2)$$

$$y3 = (y1+y2)/2 \quad (3)$$

Next, operation for change condition setting of this embodiment will be described using the flowchart shown in FIG. 16. If the processing flow for change condition setting is entered, ring display is first carried out at the position touched by both hands (S101). Here, circle radius and center position are obtained using the previously described equations (1) to (3), based on positions where fingers of both hands touched that were detected by the touch detection section 11a, and the ring is displayed as an operation guide image.

It is then determined whether or not the center is in the first quadrant (S102). Here, it is determined whether or not it is included in the first quadrant based on the center position of the circle calculated in step S101. If the result of this determination is that the center is in the first quadrant, it is then determined whether or not the diameter is greater than half of the screen width (S103). Here, determination is carried out based on the radius of the circle calculated in step S101. In this embodiment the determination value is made half the screen width because the screen is divided into 4, but this is not limiting, and can be appropriately changed as a design value.

If the result of determination in step S103 is that the diameter is greater than half the screen width, one notch of zoom change is set to a small value (S104). On the other hand if the result of determination is that the diameter is not greater than half the screen width, on notch of zoom change is set to a large value (S105). One pitch of change in step S104 and S105 is relative, and it is possible to set one pitch of change in step S105 to be larger than one pitch of change in step S104. Here, for example, with focal length of the imaging section 20 currently set to 10 times zoom of 10 mm-100 mm, if there is a zoom change of 10 mm/90 degree rotation with a small change pitch and a zoom change of 30 mm/90 degree rotation with a large change pitch, then in the case of wanting to make a large change, radius of the circle can be made small so as to make change pitch large, while in the case of wanting to make a fine change radius of the circle can be made large so as to make change pitch small.

Once one pitch of zoom change has been set in step S104 or S105, zoom processing is carried out (S106). Here, the parameter control section 11e changes focal length of the zoom lens of the imaging section 20 using the one pitch of zoom change set in step S104 or S105. Once zoom processing has been carried out, the originating processing flow is returned to.

If the result of determination in step S102 is that the center is not in the first quadrant, it is then determined whether or not the center is in the second quadrant (S107). Here, it is determined whether or not the center is contained in the second quadrant based on the center position of the circle calculated in step S101. If the result of this determination is that the center is in the second quadrant, SS change processing is next carried out (S108). Here, processing is carried out to change shutter speed. Shutter speed is changed to the high speed side or to the low speed side depending on the direction of a rotation operation for the displayed ring. Once SS change processing has been carried out, the originating processing flow is returned to.

If the result of determination in step S107 is that the center is not in the second quadrant, it is then determined whether or not the center is in the third quadrant (S109). Here, it is determined whether or not the center is contained in the third quadrant based on the center position of the circle calculated in step S101. If the result of this determination is that the center is in the third quadrant, aperture change processing is next carried out (S110). Here processing is carried out to change aperture value. Aperture value is changed towards the wide open side or towards the stopped down side, according to the direction of a rotation operation on the displayed ring. Once aperture change processing has been carried out, the originating processing flow is returned to.

If the result of determination in step S109 is that the center is not in the third quadrant, then it means that the center is in the fourth quadrant and so next focus processing is carried out (S111). Here, processing to change focus is carried out. Focus is changed towards the close range side or towards the long distance side according to the direction of a rotation operation on the displayed ring. Once focus processing has been carried out the originating processing flow is returned to.

In the fourth embodiment of the present invention, as described above, it is possible to display a plurality of small circles. It is therefore possible to have many types of condition that are desired to be changed by a rotation operation. Also, by setting a step amount for a parameter that is to be changed depending on the radius of the circle, switching of change amounts, such as when a large change is desired or when a fine change is desired, can be selected easily.

Next, a fifth embodiment of the present invention will be described using FIG. 17A to FIG. 21. In the third embodiment, description was given of an example where change instruction for a parameter is carried out by performing a rotation operation on the screen 50 using fingers of both hands. However, with a camera having interchangeable lenses, there are cases where it is difficult to operate using fingers of both hands, such as is described in the following.

Figure 17A:
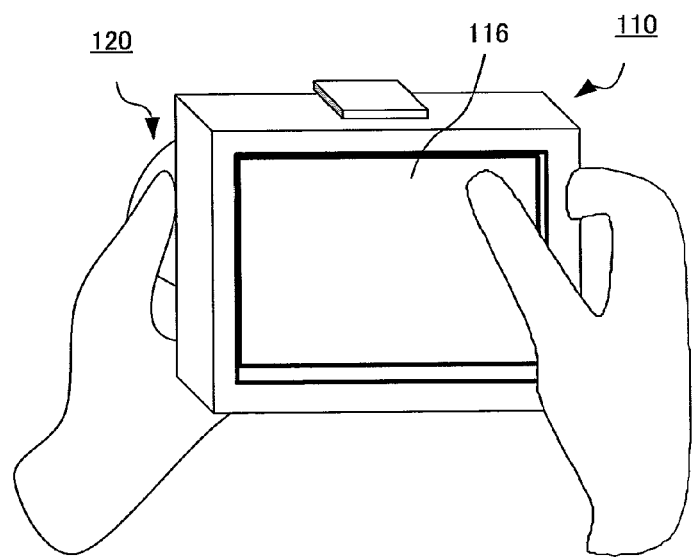
FIGS. 17A and 17B show appearance of holding a camera with interchangeable lenses of a fifth embodiment of the present invention, with FIG. 17A showing a state where an EVF is not provided on the camera body, and FIG. 17B showing a state where an EVF is provided on an upper part of the camera body.
Figure 17B:
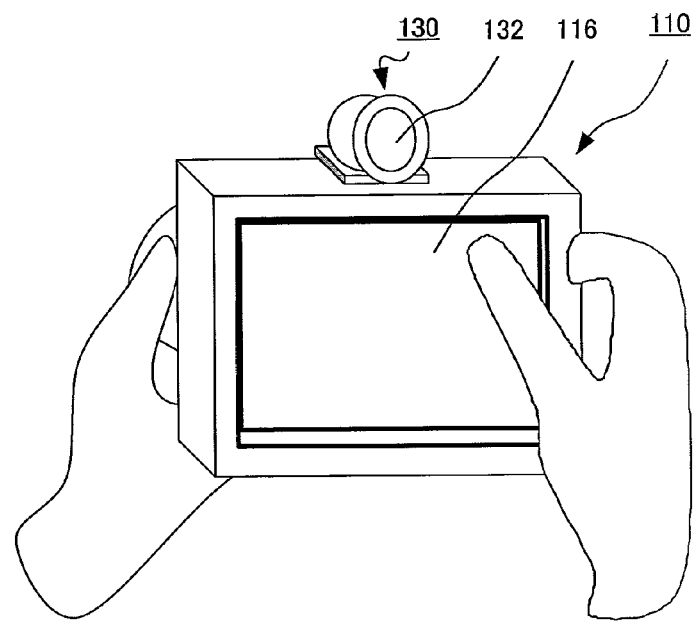

FIGS. 17A and 17B are drawings showing appearance of holding a camera with interchangeable lenses. FIG. 17A shows a state where an EVF (Electronic view finder) 130 is not provided on the camera body 110, and FIG. 17B shows a state where an EVF 130 is provided on an upper part of the camera body 130. The EVF 130 is used by the photographer bringing it close to their eye and peering through it, and is a view-through type second display device. In either state, regarding photographing styles employed using this camera with interchangeable lenses, there are many styles where the camera is firmly and securely held with both hands, and with this type of style, operations such as a rotation operation with both hands are unsuitable. In particular, with a camera having an EVF 130, such as shown in FIG. 17B, by holding it with the eye close to the EVF 130 the range of the touch panel that can be operated is restricted, which makes operations such as those shown in FIG. 12A and FIG. 12B more difficult to handle. Therefore, the fifth embodiment shows a touch operation that can be performed without difficulty regardless of the photographing style of the camera having an interchangeable lens.

Figure 18:
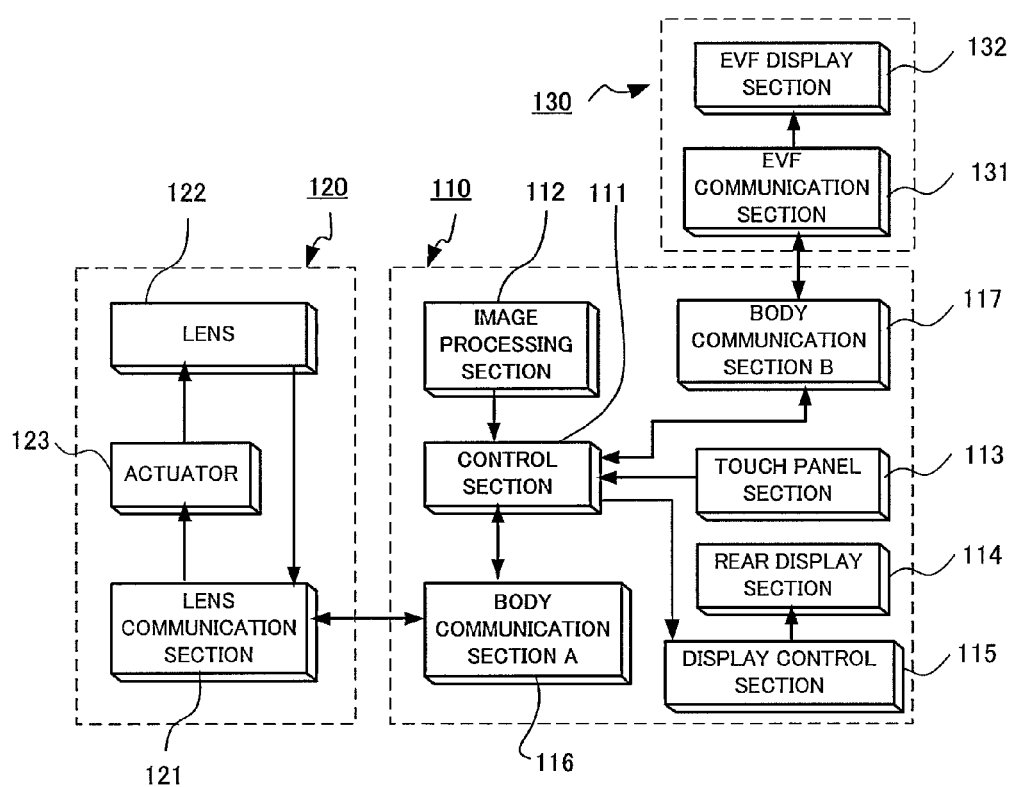
FIG. 18 is a block diagram showing the structure of the digital camera with interchangeable lenses of the fifth embodiment of the present invention.

FIG. 18 is a block diagram showing the structure of an interchangeable lens type digital camera of the fifth embodiment. With the structure of the fifth embodiment, the digital camera comprises a camera body 110 an interchangeable lens 120 and an EVF 130. The camera body 110 is only one part that is different from the block diagram of the first embodiment shown in FIG. 1, and so for the purposes of simplicity only some components that are different, and their related components, are shown in the drawing. Various types of interchangeable lens also exist, but in the following description will be given with two illustrative examples, a type where focus and aperture can be automatically adjusted from the camera body 110, and a type where focal length (electronic zoom) and focus can be automatically adjusted from the camera body 110.

A control section 111 performs overall control of the camera body 110, and of the interchangeable lens 120 and EVF 130 connected to the camera body 110. Although not shown in the drawing, the control section 111 includes a touch detection section 11a, change condition setting section 11b, operation image display section 11c, parameter change section 11d and parameter control section 11e, the same as FIG. 1.

An image processing section 112 includes an image sensor and a processing circuit for the image sensor, and put simply is the imaging section 20 of FIG. 1 with the photographing lens and actuator section removed. The touch panel section 113 and the display control section 115 are the same as those described with FIG. 1. A rear display section 113 is the same as the display section 13 shown in FIG. 1, but it will be described with a different name in order to differentiate it from the display section of the EVF 130. A body communication section A 116 supplies power for lens driving to the interchangeable lens 120, and also transmits and receives lens control information to and from the interchangeable lens 120, and acquires various information of a fitted interchangeable lens. The various information of the interchangeable lens is attribute information of the lens, such as F number, whether or not it is a zoom lens, aperture radius, focal length etc. A body communication section B 117 supplies power to the EVF and transmits image data etc. The control section 111 controls these components.

An interchangeable lens 120 is selected by the photographer considering various different conditions such as brightness, focal length etc., and attached to the camera body 110. The interchangeable lens 120 is mechanically connected to the front of the camera body 110 by means of a mount.

A lens communication section 121, lens 122, actuator 123 etc. are provided in the interchangeable lens 120. The lens communication section 121 is connected to the above described body communication section A 116 to receive power from the camera body 110, and performs transmission and reception of lens control information with the camera body 110.

The lens 122 guides subject light to the image processing section 112. The lens 122 is made up of a plurality of lens elements, and specified lens elements are configured capable of movement for focus adjustment, and with a zoom type lens there is also a structure such that specified lens elements change the focal length (zoom adjustment). An aperture for adjusting light amount is also provided inside the lens.

The actuator 123 performs focus adjustment and change of focal length etc. by driving the lens 122 based on control information sent from the camera body 110 via the lens communication section 121, or sets the aperture radius to a specified value by driving the aperture.

The EVF 130 is attached to the center of an upper part of the camera body 110 in a detachable manner, as shown in FIG. 17B. An EVF communication section 131 and an EVF display section 132 are provided in the EVF 130. The EVF communication section 131 is connected to the body communication section B 117 and is input with a power supply and image data. The EVF display section 132 is formed, for example, from a small LCD or organic EL, and displays an image in accordance with input image data.

The control section 111 performs different operational control for the touch panel according to whether or not the EVF 130 is used and the type of interchangeable lens that has been attached. First, the control section 111 makes the rear display section 114 the destination for display of images etc, if the EVF 130 is not attached. On the other hand, in a state where the EVF is used in shooting mode, the display destination for images etc. is switched from the rear display section 114 to the EVF display section 132. The control section 111 then stops display to the rear display section 114, but the touch panel 113 still operates to allow touch instructions. The display to the rear display section 114 is stopped in order to conserve power.

In a state where the EVF 130 is used, there are cases where notification that the EVF 130 is connected to the camera body 110 is detected from the body communication section B 117, and cases such as where the EVF display section 132 is selected as the display destination using a menu screen, not shown in the drawings, after the EVF 130 is fitted. There are also cases where, with a camera having an EVF 130 fixed to the camera body, the EVF display section 132 is selected as the display destination using the menu screen.

Also, the control section 111 procures type information of the interchangeable lens via the body communication section A 116, and sets parameter types in response to a touch operation in accordance with the type of the interchangeable lens.

Figure 19:
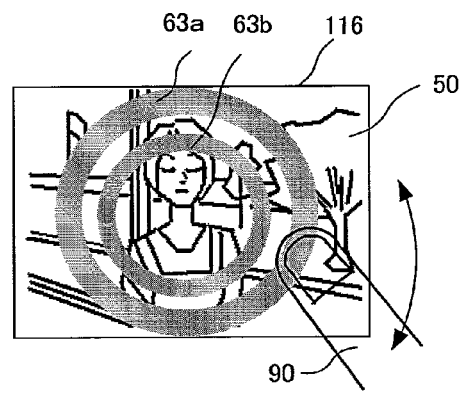
FIG. 19 shows a live view screen on which an operation guide image is overlaid on a screen displayed on a rear display section of the digital camera with interchangeable lenses of the fifth embodiment of the invention.

Next, screen content displayed in response to touch input will be described using FIG. 19 and FIG. 20A to FIG. 20D. FIG. 19 is a live view screen overlaid with operation guide images, and is a screen displayed on the rear display section 114. This state is a state where the EVF 130 is not used. For example, there are situations where the EVF 130 is not attached to the camera body 110. If a finger 90 placed at the right side of the screen 50 is detected rotating in the direction of either arrow, operation guide images are displayed superimposed on the live view image, as shown in FIG. 19, by the operation guide image display section 11c inside the control section 111.

The operation image display section 11c displays two rings, for example the outer ring 63a and the inner ring 63b, as operation guide images. The change condition setting section 11b sets, for example focus adjustment as a change parameter for the outer ring 63a, and aperture adjustment as a change parameter for the inner ring 63b, in accordance with the interchangeable lens type.

Then, the parameter change section 11d changes the focus position in the close range direction if a clockwise rotation is detected on the outer ring, and conversely changes the focus position in the long-range direction if a counter clockwise rotation is detected. Also, aperture is changed in the wide-open direction if a clockwise rotation is detected at the inner ring, while the aperture is changed in a stopping down direction if a counter clockwise rotation is detected. It is also possible to arbitrarily select which of focus adjustment or aperture adjustment is set as the outer or inner ring, or to select which rotational direction is set as an increase or decrease of a parameter.

With the third embodiment, control was carried out such that in the case of an operation with both fingers two rings were displayed, but here, in the case where there is a rotation using one (the right) finger also, by displaying operation guide images of two rings a touch operation can be performed without difficulty even by someone holding a camera with an interchangeable lens.

Figure 20A:
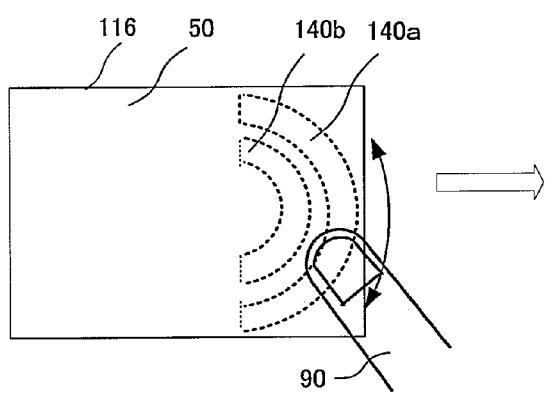
FIG. 20A to FIG. 20D are drawings showing a screen of an EVF display section of the digital camera with interchangeable lenses of the fifth embodiment of the present invention.
Figure 20B:
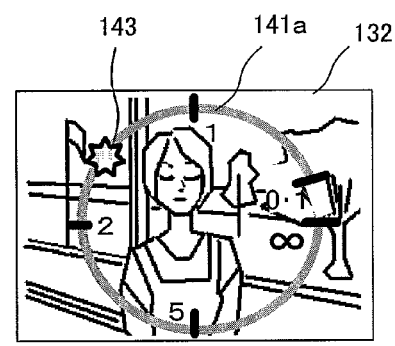

Next, FIG. 20A to FIG. 20D are screens on the EVF display section 132. If the EVF 130 is attached to the camera body 110, it is a state where the EVF 130 is used. FIG. 20A is a screen 50 of the rear display section 114 with live view display not being displayed. This is for power conservation. Here, an outer region 140a and an inner region 140b shown by dotted lines in FIG. 20A are set to effective detection ranges. The dotted lines of the outer region 140a and the inner region 140b are shown for the description, but are not actually displayed. FIG. 20B is a screen of the EVF display section 132, with a live view image displayed.

If a finger 90 performs a rotation operation on the outer region 140a such as shown in FIG. 20B, the fact that there is a rotation at the outer region is detected by the touch detection section 11a. Then, as shown in FIG. 20B, the outer ring 141a is displayed on the screen of the EVF display section 132 as an operation guide image by the operation image display section 11c. Here, the displayed outer ring 141a is an operation guide image for focus adjustment. About one loop of the outer ring 141a is assigned to a focus range from the closest, which is 0.1 m, to infinity (●). "0.1, 1, 2, 5, ●" are displayed along the outer ring 141a by the operation image display section 11c.

Also, a cursor 143 shows a value of the current focus position, and moves on the outer ring 141a in accordance with rotation. Also, at the time of EVF display only the outer ring 141a corresponding to the operation is displayed on the EVF display section 132, and the inner ring 141b is not displayed. This is in order to give priority to subject confirmation and avoid hindering confirmation of the live view image.

Figure 20C:
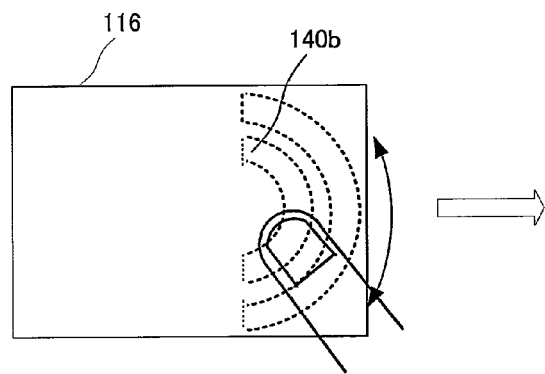
Figure 20D:
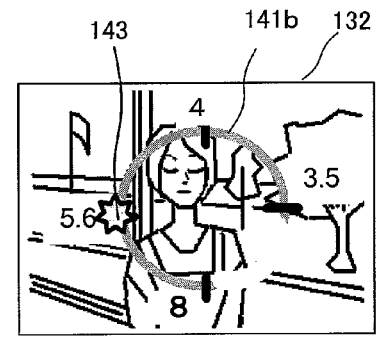

Next, if there is an operation to rotate a finger 90 degrees in the inner region 140b, as shown in FIG. 20C, a rotation operation at the inner region is detected by the touch detection section 11a. Then, the inner ring 141b is displayed on the EVF display section 132 as an operation guide image by the operation image display section 11c, as shown in FIG. 20D. The inner ring 141b displayed here is an operation guide image for aperture adjustment. About ¾ of the way round the inner ring 141b is displayed representing from wide open of F3.5 to F8. Numerical values of "3.5, 4, 5.6, 8" are displayed along the inner ring 141b as aperture values by the operation image display section 11c.

Also, the cursor 143 is for showing the current aperture value, and so it moves on the inner ring 141b in response to rotation. For the same reason as with FIG. 20B, only the inner ring 141b corresponding to the operation is displayed on the EVF display section 132.

Also, as will be understood from a comparison of FIG. 19 with FIG. 20B and FIG. 20D, the ring width for the EVF display is displayed thinly, and this is in order to further prevent hindrance to subject confirmation in the case of display on the EVF 130.

Camera operation in the fifth embodiment will be described, but the basic operation is substantially the same as the flowchart of the first embodiment shown in FIG. 6, and so description will center on points of difference using FIG. 6. From step S11 to S13 is the same. Then, in step S21 of the first embodiment a live view image was displayed on the display section 16, but with this embodiment, in step S21 the control section 111 determines if the EVF 130 is in use, and selects which of the display devices to display the live view image on. If the control section 111 determines that the EVF 130 is in use, an image is displayed on the EVF display section 132, and display to the rear display section 114 is suspended. Conversely, if it is determined that the EVF 130 is not being used display is carried out to the rear display section 114.

Similarly, in the case of image playback in step S16 also, if it is determined that the EVF 130 is in use the control section 111 displays an image on the EVF display section 132 in step S21, and suspends display to the rear display section 114. Continuing on from selection of a display destination in accordance with whether or not there is an EVF 130 in step S21, processing advances to the change condition setting subroutine (step S22).

Figure 21:
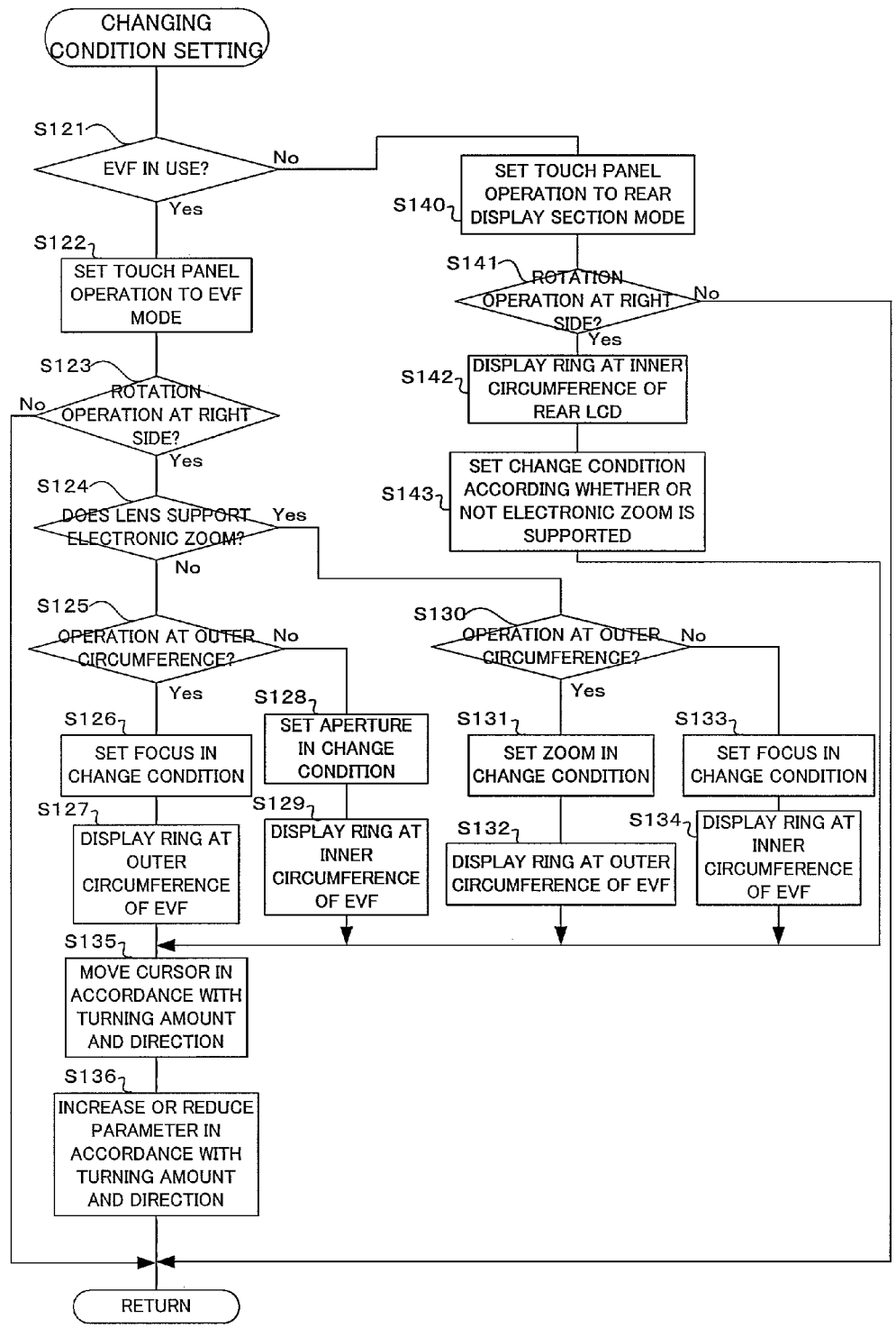
FIG. 21 is a flowchart showing processing for condition change setting of the digital camera with interchangeable lenses of the fifth embodiment of the present invention.

FIG. 21 is a flowchart for describing change condition setting processing of the fifth embodiment. First, it is once again determined whether the EVF 130 that was detected in step S21 described above is being used (S121). If it is determined by the control section 111 that the EVF 130 is in use (YES at S121) the change condition setting section 11b sets the touch panel operation to EVF mode (S122). EVF mode is a mode for displaying an operation or image as was described with FIG. 20A to FIG. 20D. The control section 111 sets corresponding parameter type and ring inner or outer position in accordance with a fitted interchangeable lens. This will be described in detail later.

Next, it is determined if a touch operation was a rotation operation at the right side of the screen 50 (S123). This is in order to limit to operations appropriate to a camera with interchangeable lens. In the event that a touch operation was not a rotation operation at the right side of the screen 50 NO in step S123), it is interpreted to mean that an operation is invalid and this subroutine is exited. Seeing operations other than designated operations as invalid is in order to prevent erroneous operation. With this embodiment, touch operation is carried out using only one hand, which means that it is also possible to determine a touch operation at two places (both hands) to be invalid.

If a touch operation is determined to be a rotation operation at the right side of the screen 50 (YES in S123), it is next determined whether the interchangeable lens 120 supports electronic zoom (S124). If it does not support electronic zoom (NO at S124), then with this embodiment, since interchangeable lenses are limited to two types it is determined that the fitted interchangeable lens is "a type capable of adjusting focus and aperture from the camera body".

If the result of determination in step S124 is that the lens does not support electronic zoom, it is first determined whether the position of an operation is outer circumference (S125). If the operation position is outer circumference (YES at S125), focus is set in the change condition by the change condition setting section 11b (S126). Accordingly, the outer ring 141a is displayed on the outer circumference of the EVF display section 132 by the operation image display section 11c (S127). This screen is shown in FIG. 20B.

On the other hand, if the position of the operation is not outer circumference (NO in S125), that is, the operation is at the inner circumference, aperture is set in the change condition by the change condition setting section 11b (S128). Accordingly, the inner ring 141b is displayed at the inner circumference of the EVF display section 132 by the operation image display section 11c (S129). This screen is shown in FIG. 20D.

After displaying the ring on the EVF display section 132 (S127 or S129), a rotation amount and direction of the touch operation are detected, and the cursor 143 is moved on the displayed ring in accordance with the rotation amount and direction of the touch operation (S135). At the same time, the parameter change section 11d increases or reduces parameters in accordance with the rotation amount and direction (S136), and the parameter control section 11e sends instructions via the body communication section A 116 to the interchangeable lens 120 so as to specifically change the focus adjustment value or aperture value. At the interchangeable lens 120, those instructions are input via the lens communication section 121, and in response to the instructions the actuator 123 either moves the focus lens to a specified position in the case of focus adjustment, or changes the aperture to the instructed value in the case of aperture adjustment.

Returning to step S124, if the result of determination is that the fitted interchangeable lens supports electronic zoom (YES in S124), then of the two types this is a case of the interchangeable lens being the type where zoom (focal length) and focus can be adjusted from the camera body. This case is similar to the case of step S125, and it is determined if the operation position is the outer circumference (S130). If the result of this determination is that the operation position is at the outer circumference (YES at S130), zoom is set in the change condition by the change condition setting section 11b (S131). Accordingly, the outer ring 141a corresponding to zoom is displayed at the outer circumference of the EVF display section 132 by the operation image display section 11c (step S132).

On the other hand, if the result of determination in step S130 is that the operation position is not the outer circumference (NO at S130), namely that the operation position is the inner circumference, focus adjustment is set in the condition change by the change condition setting section 11b (S133). Accordingly, the inner ring for focus adjustment is displayed on the EVF display section 132 by the operation image display section 11c (S134).

Once display of the inner or outer ring has been carried out in step S132, or S134, the cursor is moved on the screen in accordance with rotation amount and direction of the operation (step S135). At the same time, the parameter change section 11d increases or reduces parameters in accordance with the rotation amount and direction (S136), and the parameter control section 11e sends instructions via the body communication section A 116 to the interchangeable lens 120 so as to specifically change the focus adjustment value or zoom value (focal length). At the interchangeable lens 120, those instructions are input via the lens communication section 121, and in response to the instructions the actuator 123 either moves the focus lens to a specified position in the case of focus adjustment, or moves the zoom lens to a specified position in the case of zoom adjustment.

Returning to step S121, if the result of determination is that the EVF 130 is not in use (NO at S121), the change condition setting section 11b sets the touch panel operation to rear display section mode (S140). Rear display section mode is a mode for displaying an operation or a screen as described with FIG. 19. The control section 111 sets corresponding parameter type and inner or outer position of the ring according to the fitted interchangeable lens. This will be described in detail later.

Next, similarly to step S122, it is determined whether a touch operation is a rotation operation at the right side of the screen 50 (S141). This is in order to limit to operations appropriate to a camera with interchangeable lens. In the event that a touch operation was not a rotation operation at the right side of the screen 50 (NO in step S141), it is interpreted to mean that the operation is invalid and this subroutine is exited. Similarly to the description for step S123, it is also possible to determine a touch operation at two places (both hands) to be invalid.

If it is determined that the touch operation is a rotation operation at the right side of the screen 50 (YES at S141), change condition is set according to whether or not the fitted interchangeable lens 120 supports electronic zoom and whether the operation is at the outer circumference (S143). As this is the same as steps S124 to S134, details will be omitted. Obviously, compared to the state where the EVF 130 is in use, it is possible to change so that parameters allocated to inner circumference and outer circumference are reversed. After condition change setting in step S143, processing advances to the above described step S135. After the processing of the above described steps S135 and S136 has been carried out and this sub-routine terminated, processing advances to step S23 in FIG. 6.

Steps S23 to S25 in FIG. 6 are the same as the description for the first embodiment, and so description will be omitted. Since steps S14 to S18 are also the same, description will be omitted.

As described above, according to the fifth embodiment it is possible to carry out a panel operation with good usability even by a person holding a camera with interchangeable lens. Also, in the state where the EVF 130 is in use rings are displayed on the EVF display section. Depending on whether the display destination is the rear display section of the EVF, display appearance, such as the number of rings displayed and the ring width etc. can be changed, which means that it is possible to carry out display that is easy to see depending on the type of display section.

Further, in the case where the EVF is fitted, the parameter change amount for a given operation amount is made larger compared to the case where the EVF is not fitted. For example, with a camera provided with the EVF on a rear display section, in a photographing posture looking through the EVF, the space where it is possible to carry out an operation on the touch panel is limited to the left and right ends, and the rotation range for a singe operation becomes narrow. By making the operation sensitivity large, usability is prevented from deteriorating even when the EVF is attached.

Also, parameter type is automatically selected according to the type of interchangeable lens, which means that the time and effort of the photographer manually selecting the parameter type for each interchangeable lens is also done away with.

In the case where the fitted interchangeable lens is a type that supports electronic zoom, then in addition to the optical zoom using the interchangeable lens 120 it is also possible to carry out processing so as to add in electronic zoom using the image processing section 21. In this case, a zoom parameter instructed by an outer circumference rotation is processed by being divided into optical zoom and electronic zoom. Normally, optical zoom would be given priority, and after reaching the maximum magnification with the optical zoom electronic zoom is additionally performed.

Also, in the state where the EVF is in use, compared to the state where the EVF is not in use, which will be described later, it is possible to set the parameter change amount large per unit change in rotation operation amount. This is because in the state where the EVF is in use, it becomes impossible to turn through a large angle (for example 180 degrees) in one go. For example, with focus adjustment, as an operation to change a parameter from 0.1, to infinity (●), when the EVF is used a 90 degree rotation is set, and when the EVF is not used a 180 degree rotation is set. Also, for example, one step of aperture adjustment is set to a 90 degree rotation when the EVF is used, and a 180 degree rotation when the EVF is not used.

It is also possible to make switching between types of parameter and between inner and outer circumference settable via menu screens. In step S123 and S141, determination has been made as to whether or not there is a rotation operation at the right side of the screen, assuming a photographer to be right handed, but this is not limiting, and it is also possible to determine whether or not a rotation operation has been performed at the left side so as to be able to support left handed photographers.

As described above, with each of the embodiments of the present invention it is possible to change the type of parameter to be changed according to the manner of an input operation to a touch panel. It is therefore possible to easily input various types of parameters with an organized screen. Also, with each embodiment, operation guide images are displayed according to parameters that are changed. It is therefore possible for a user to easily perform input in accordance with the guidance operation images.

Display control processing for the index screen described above is carried out by the control section 11 reading out and executing a program for operation control that is contained in the program/data storage section 12, and so the storage medium storing a control program relating to this type of software process is also an object of the present invention. A storage medium holding this program is not limited to a flash memory, and can be an optical storage medium such as CD-ROM or DVD-ROM, a magnetic storage medium such as MD, or tape medium, IC card or semiconductor memory such as USB memory.

Also, with each of the embodiments of the present invention, execution of processing has been described as a combination of software processing and hardware processing, but this is not limiting and the combination is a matter of choice.

Also, with each of the embodiments a digital camera has been described as a device for taking pictures, but as a camera it is possible to have a digital single lens reflex camera, a compact digital camera, or a movie camera. A portable device is not limited to a camera, and it is also possible to apply the invention to a mobile telephone, a movie camera, a Personal Digital Assistant (PDA), portable game unit, or music player etc.

The present invention is not limited to the above described embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A condition change unit for changing operating conditions of a device, comprising:
   a display section for displaying images;
   a touch panel provided on the display section;
   a detection section for detecting input operations to the touch panel;
   a change condition setting section for setting types of change conditions, based on a mode of the input operations detected by the detection section;

an operation guide image display section for displaying guidance images, for setting specific parameters of the change conditions, on the display section, in accordance with the type of change condition that has been set;

a parameter change section for changing parameters of the change condition based on an input operation to a screen on which the operation guidance operation images are displayed that has been detected by the detection section;

a view-through type second display section for displaying images; and a control section for selecting whether to display on the display section, or to display on the second display section; wherein the operation image display section has a different display format for a case where the operation guide images are displayed on the display section, and a case where the operation guide images are displayed on the second display section.

2. A camera of claim 1, comprising
a camera body having the display section fixedly provided on a rear surface, and having the second display section removably attached thereto.

3. A condition change unit for changing operating conditions of a device, comprising:
a display section for displaying images;
a touch panel provided on the display section;
a detection section for detecting input operations to the touch panel;

a change condition setting section for setting types of change conditions, based on a mode of the input operations detected by the detection section;

an operation guide image display section for displaying guidance images, for setting specific parameters of the change conditions, on the display section, in accordance with the type of change condition that has been set;

a parameter change section for changing parameters of the change condition based on an input operation to a screen on which the operation guidance operation images are displayed that has been detected by the detection section;

a second view through type display section for displaying images is provided;

the operation guide image display section displays the operation guide images on either the display section or the second display section, and the parameter change section switches a change amount for a parameter in accordance with amount of an input operation, in response to a display destination for the operation guide images being the display section or the second display section.

4. A camera of claim 3, wherein
the display section is fixedly provided on a rear surface, and the second display section is removably attached to a camera body.

* * * * *